(12) United States Patent
Nagano et al.

(10) Patent No.: US 7,672,457 B2
(45) Date of Patent: Mar. 2, 2010

(54) COMPUTER-READABLE RECORDING MEDIUM RECORDING A WIRELESS COMMUNICATION AUTHENTICATION PROGRAM

(75) Inventors: Yuji Nagano, Fukuoka (JP); Kazuhiro Ichiyanagi, Kawasaki (JP); Akiko Kusumoto, Kawasaki (JP); Hisayoshi Naito, Fukuoka (JP); Shinichirou Miyajima, Fukuoka (JP); Kazuyuki Inomoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1167 days.

(21) Appl. No.: 11/236,518

(22) Filed: Sep. 28, 2005

(65) Prior Publication Data

US 2006/0018481 A1    Jan. 26, 2006

Related U.S. Application Data

(63) Continuation of application No. PCT/JP03/08327, filed on Jun. 30, 2003.

(51) Int. Cl.
*H04L 9/00* (2006.01)
*G06F 7/04* (2006.01)
*H04L 9/32* (2006.01)

(52) U.S. Cl. .................. 380/270; 713/168; 713/169; 713/170; 713/171; 713/174; 726/3; 726/4; 726/5; 726/6; 726/7

(58) Field of Classification Search .................. 380/270
See application file for complete search history.

(56) References Cited

U.S. PATENT DOCUMENTS

| 5,311,596 | A | 5/1994 | Scott et al. |
|---|---|---|---|
| 5,440,633 | A | 8/1995 | Augustine et al. |
| 5,524,052 | A | 6/1996 | Augustine et al. |
| 6,134,431 | A | 10/2000 | Matsumoto et al. |

(Continued)

FOREIGN PATENT DOCUMENTS

CA    2104849    3/1994

(Continued)

OTHER PUBLICATIONS

Japanese Patent Office Action dated Feb. 10, 2009 in corresponding Japanese Appln. No. 2005-503375.

(Continued)

*Primary Examiner*—Longbit Chai
(74) *Attorney, Agent, or Firm*—Staas & Halsey LLP

(57) ABSTRACT

A wireless communication authentication program whereby a slave station in a small-scale wireless LAN system can be authenticated by a simple procedure. A wireless communication authentication device periodically increments a first system timer value (Step S1) for which an optional numerical value is set beforehand. A wireless communication device sets therein a second system timer value (Step S2) so as to coincide with the first system timer value and periodically increments the second system timer value (Step S3). The wireless communication device transmits an authentication request command including a third system timer value (Step S4), and the wireless communication authentication device compares the third system timer value included in the authentication request command with the first system timer value thereof assumed at the time of reception of the command (Step S6). In accordance with the comparison result, the wireless communication authentication device determines whether to authenticate the wireless communication device.

6 Claims, 32 Drawing Sheets

U.S. PATENT DOCUMENTS

| | | | |
|---|---|---|---|
| 7,373,508 B1* | 5/2008 | Meier et al. | 713/168 |
| 2005/0033964 A1* | 2/2005 | Albanese et al. | 713/171 |

FOREIGN PATENT DOCUMENTS

| | | | |
|---|---|---|---|
| EP | 0 588 519 A2 | | 3/1994 |
| EP | 0 645 912 A2 | | 3/1995 |
| JP | 5-336108 | | 12/1993 |
| JP | 9-162858 | | 6/1997 |
| JP | 09-162858 | * | 6/1997 |
| JP | 10-112883 | | 4/1998 |
| JP | 2002-281027 | | 9/2002 |
| WO | WO 02/32308 A1 | * | 4/2002 |

OTHER PUBLICATIONS

Patent Abstracts of Japan, Publication No. 10-112883, published Apr. 28, 1998.

Patent Abstracts of Japan, Publication No. 2002-281027, published Jan. 13, 2005.

Patent Abstracts of Japan, Publication No. 05-336108, published Dec. 17, 1993.

Patent Abstracts of Japan, Publication No. 02-067067, published Mar. 7, 1990.

Patent Abstracts of Japan, Publication No. 03-258050, published Nov. 18, 1991.

Patent Abstracts of Japan, Publication No. 09-107350, published Apr. 22, 1997.

International Search Report dated Nov. 4, 2003 in corresponding PCT Patent Application No. PCT/JP03/08327.

Patent Abstracts of Japan, Publication No. 06-204998 Published Jul. 22, 1994.

Patent Abstracts of Japan, Publication No. 07-087116 Published Mar. 31, 1995.

Patent Abstracts of Japan, Publication No. 09-162858 Published Jun. 20, 1997.

Patent Abstracts of Japan, Publication No. 2000-122863 Published Apr. 28, 2000.

Patent Abstracts of Japan, Publication No. 2001-111544 Published Apr. 20, 2001.

Patent Abstracts of Japan, Publication No. 2002-259344 Published Sep. 13, 2002.

Patent Abstracts of Japan, Publication No. 2002-281027 Published Sep. 27, 2002.

* cited by examiner

| | MAC ADDRESS | AUTHENTICATION STATUS | AUTHENTICATION COUNT | ENCRYPTION KEY |
|---|---|---|---|---|
| 1 | 00 : 60 : B3 : 68 : 4D : 99 | AUTHENTICATED | 12 | ABCP394PT1AMX |
| 2 | 00 : 60 : B3 : 70 : 3E : 91 | AUTHENTICATING | 0 | - |
| 3 | 00 : 60 : B3 : 59 : DD : 98 | AUTHENTICATING | 5 | 1NLPP39WQTSAM |

181 SLAVE STATION MANAGEMENT TABLE

182 SLAVE STATION MANAGEMENT TABLE

| | MAC ADDRESS | AUTHENTICATION STATUS | AUTHENTICATION COUNT | RECEPTION COUNT | CONSECUTIVE FAILURE COUNT | ENCRYPTION KEY |
|---|---|---|---|---|---|---|
| 1 | 00:60:B3:68:4D:99 | AUTHENTICATED | 12 | 12 | 0 | ABCP394PT1AMX |
| 2 | 00:60:B3:70:3E:91 | AUTHENTICATING | 0 | 3 | 3 | — |
| 3 | 00:60:B3:59:DD:98 | AUTHENTICATING | 5 | 4 | 1 | 1NLPP39WQTSAM |

→ TO SLAVE STATION REFUSAL MANAGEMENT TABLE

191 SLAVE STATION REFUSAL MANAGEMENT TABLE

|   | MAC ADDRESS | REGISTRATION TIME |
|---|---|---|
| 1 | 00 : 60 : B9 : 70 : 3E : 91 | 2003.06.15 12 : 36 |
| 2 | 00 : 60 : B3 : 70 : 3E : 91 | 2003.06. 25 21 : 45 |

151 ENCRYPTION SCHEME MANAGEMENT TABLE

| RANGE IDENTIFIER | SYSTEM TIMER AUTHENTICATION INFORMATION | ENCRYPTION SCHEME |
|---|---|---|
| a | A0FFFFFFFFFFFFFF~A0000000000000000 | SCHEME A |
| b | A1FFFFFFFFFFFFFF~A1000000000000000 | SCHEME B |
| c | A2FFFFFFFFFFFFFF~A2000000000000000 | SCHEME C |
| d | A3FFFFFFFFFFFFFF~A3000000000000000 | SCHEME D |
| e | A4FFFFFFFFFFFFFF~A4000000000000000 | SCHEME E |
| f | A5FFFFFFFFFFFFFF~A5000000000000000 | SCHEME F |

COMPUTER-READABLE RECORDING MEDIUM RECORDING A WIRELESS COMMUNICATION AUTHENTICATION PROGRAM

CROSS-REFERENCE TO RELATED APPLICATIONS

This application is a continuing application, filed under 35 U.S.C. §111(a), of International Application PCT/JP2003/008327, filed Jun. 30, 2003.

BACKGROUND OF THE INVENTION

1. Field of the Invention

The present invention relates to computer-readable recording media recording wireless communication authentication programs, and more particularly, to a computer-readable recording medium recording a wireless communication authentication program having the function of preventing an outsider's illegal access.

2. Description of the Related Art

In information communications via networks, it is necessary that illegal acts such as an outsider's illegal access should be prevented. Various security technologies have therefore been developed for information communications via wired LANs (Local Area Networks).

For example, with respect to software to be executed by a client device (hereinafter merely referred to as client), a server machine issues, to the client, an authentication key specifying a term of validity. When the software is to be executed by the client, the stored authentication key and validity term are checked against the current date and time indicated by the calendar timer of the client, to determine whether to permit the execution of the software (e.g., Unexamined Japanese Patent Publication No. 2000-122863).

Also, as authentication schemes using a one-time password, a technique is known which makes use of time information of a mobile telephone in order to manage secret information while ensuring security of the one-time password. One-time password scheme is a scheme wherein a password displayed on a small portable device called token, instead of a password memorized by the user, is input for the purpose of user authentication. For example, in a mobile telephone, a hash value is obtained using a user ID, current time information and common secret information, to generate a one-time password. The user inputs the generated one-time password and the user ID to a user PC (Personal Computer), whereupon the input information is sent to a user authentication server. On receiving the user ID and the one-time password from the user PC, the user authentication server causes a hash generator therein to similarly generate a one-time password by using the received user ID, current time information and common secret information, and the generated one-time password is used for the verification by a one-time password verifier (e.g., Unexamined Japanese Patent Publication No. 2002-259344).

Meanwhile, as a result of the recent advance in wireless LAN technologies, data communications can be performed using a terminal device connectable to a wireless LAN, without the need for cable connection. For example, a wireless LAN communication environment may be created inside a factory, whereby the terminal device can communicate wherever in the factory it is moved, without changing network settings etc. This improves the efficiency of work using computers.

In the case of wireless LAN, however, communication data is carried by electromagnetic waves and thus can be tapped relatively easily, compared with the case of wired LAN. Accordingly, when configuring a wireless LAN, it is necessary to employ more sophisticated security techniques than those required for a wired LAN. Such security techniques include techniques for preventing outsider's illegal connection, and as such illegal connection prevention techniques, a technique is known wherein only the terminal devices authenticated by an authentication server are allowed to connect to a wireless LAN.

FIG. 31 shows an exemplary configuration of a conventional wireless LAN system. An authentication server 91 is connected via an IP (Internet Protocol) network 92 to an access point 93 which is connected to a client 94 by wireless. The access point 93 and the client 94 are in a relationship such that the access point 93 functions as a master station of wireless communication while the client 94 as a slave station. The authentication server 91 is a computer for performing authentication following the procedures provided by IEEE 802.1x. In accordance with the procedures defined by RADIUS (Remote Authentication Dial-In User Service), the authentication server 91 authenticates the user who uses the client 94. Details of RADIUS are publicized as RFC 2138 and 2139.

FIG. 32 shows an authentication sequence of the conventional wireless LAN system. In FIG. 32, a user authentication sequence is executed between the slave station (client 94), the master station (access point 93) and the authentication server 91 (Step S201). An encryption key is delivered from the authentication server 91 to the master station (access point 93) and then to the slave station (client 94). Using the delivered encryption key, the client 94 encrypts data to be communicated (Step S202).

The authentication scheme according to IEEE 802.1x is, however, prescribed on the assumption that the scheme is applied to a large-scale wireless LAN system as a whole. Accordingly, even in the case of a small-scale system based on P-P (Point-to-Point) communication, for example, the authentication server 91 needs to be provided on the network, though there are only two wireless LAN devices on the network, which entails an increase in the cost of equipment.

Moreover, the authentication process needs to be periodically performed by the authentication server 91 to dynamically change the encryption key. By dynamically changing the encryption key, it is possible to prevent the encryption key from being decrypted, thereby greatly enhancing security. However, since the encryption key is dynamically changed, the user authentication sequence is frequently executed between the slave station (client 94), the master station (access point 93) and the authentication server 91. As a result, a problem arises in that the throughput of actual communication lowers due to increase in the communication time required for communication other than data communication.

SUMMARY OF THE INVENTION

The present invention was created in view of the above circumstances, and an object thereof is to provide a computer-readable recording medium recording a wireless communication authentication program whereby a slave station in a small-scale wireless LAN system can be authenticated by means of a simple system.

To achieve the object, there is provided a computer-readable recording medium recording a wireless communication authentication program for authenticating a wireless communication device connected via a wireless network. The wireless communication authentication program recorded on the recording medium causes a computer to perform the process of periodically incrementing a local system timer value thereof for which an optional numerical value is set beforehand, comparing, on reception of an authentication request command including a remote system timer value from the wireless communication device, the received remote system timer value with the local system timer value assumed at the time of the reception, and determining whether the remote system timer value and the local system timer value coincide or not to judge whether to authenticate the wireless communication device which issued the authentication request command.

Also, to achieve the above object, there is provided a computer-readable recording medium recording a wireless communication program for performing communication via a wireless network subsequently to authentication by a wireless communication authentication device connected via the wireless network. The wireless communication program recorded on the recording medium causes a computer to perform the process of periodically incrementing a local system timer value thereof which has been set so as to coincide with a remote system timer value set in the wireless communication authentication device, and transmitting, at start of communication via the wireless network, an authentication request command including the local system timer value to the wireless communication authentication device.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 13 shows an exemplary data structure of a slave station management table.

FIG. 16 shows an exemplary data structure of a slave station management table according to the third embodiment.

FIG. 17 shows an exemplary data structure of a slave station refusal management table.

FIG. 29 shows an exemplary data structure of an encryption scheme management table.

DESCRIPTION OF THE PREFERRED EMBODIMENTS

Figure 1:
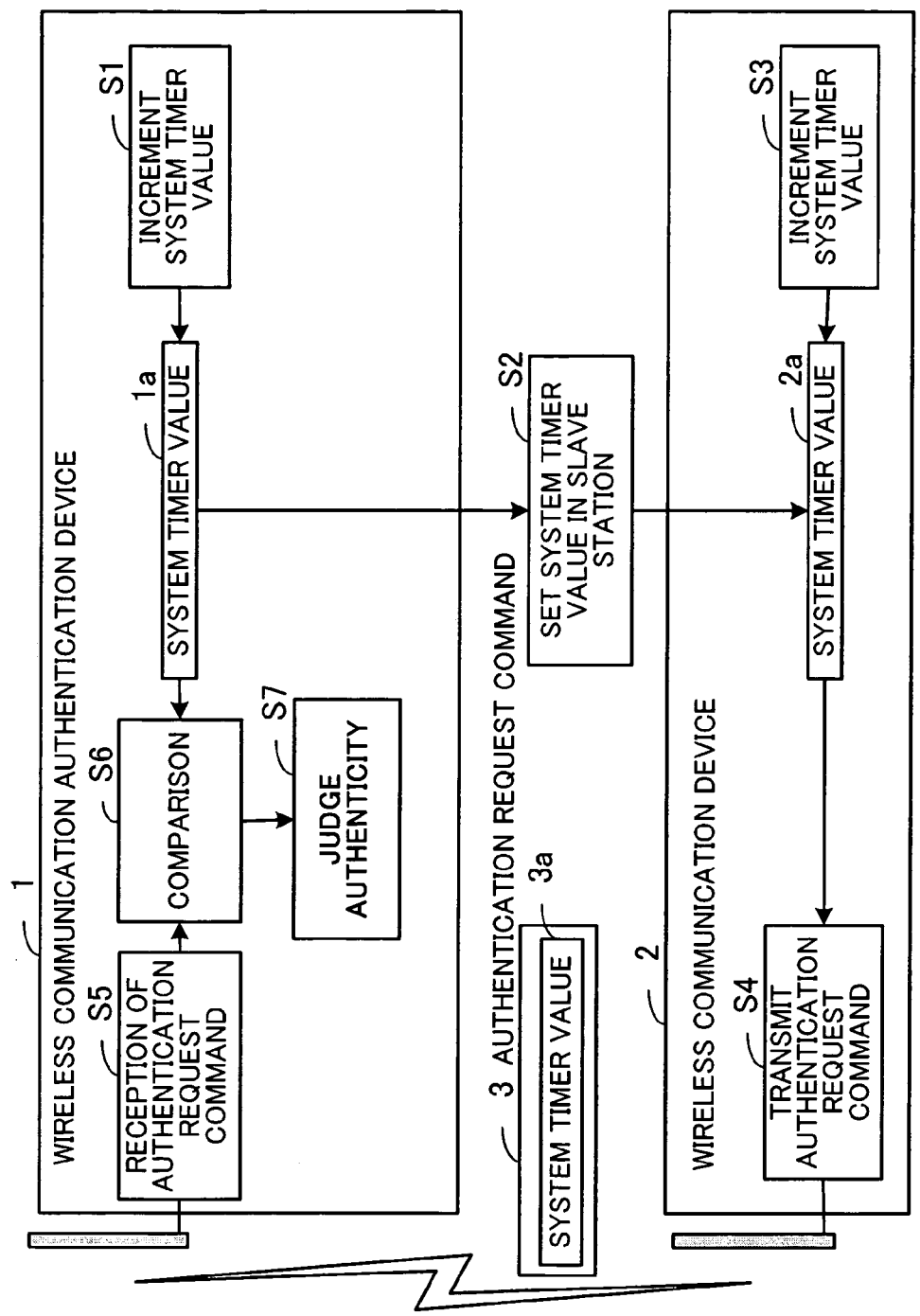
FIG. 1 is a conceptual diagram illustrating the invention applied to embodiments.

Preferred embodiments of the present invention will be described below with reference to the accompanying drawings, wherein like reference numerals refer to like elements throughout.

First, the invention applied to the embodiments will be outlined, and then specific embodiments will be described.

FIG. 1 is a conceptual diagram illustrating the invention applied to the embodiments. As shown in FIG. 1, a wireless communication authentication device 1 and a wireless communication device 2 are connected by a wireless network. Following the procedure described below, the wireless communication authentication device 1, as a master station, authenticates the wireless communication device 2, as a slave station, connected thereto via the wireless network.

First, the wireless communication authentication device 1 periodically increments a system timer value 1a thereof (Step S1) for which an optional numerical value is set beforehand. Then, in the wireless communication device 2 as the slave station, a system timer value 2a is set so as to coincide with the system timer value 1a set in the wireless communication authentication device 1 as the master station (Step S2). The wireless communication device 2 periodically increments the system timer value 2a (Step S3). At the start of communication via the wireless network, the wireless communication device 2 transmits an authentication request command 3 including the system timer value 3a to the wireless communication authentication device 1 (Step S4).

On receiving the authentication request command 3 (Step S5), the wireless communication authentication device 1 compares the system timer value 3a included in the authentication request command 3 received from the wireless communication device 2 with the master station system timer value 1a assumed at the time of the command reception (Step S6). The wireless communication authentication device 1 then determines whether the slave station system timer value 3a and the master station system timer value 1a coincide or not, to thereby judge whether to authenticate the wireless communication device 2 which issued the authentication request command.

In this manner, the system timer value, which is set to an optional value beforehand, is incremented on both sides and the incremented system timer values are compared with each other for the purpose of authentication. Accordingly, only the wireless communication device 2 whose system timer value was set to an identical value in the past can successfully be authenticated by the wireless communication authentication device 1.

The system timer value is incremented, and thus, as the authentication process is repeated, the system timer value 3a included in the authentication request command 3 also varies and does not remain the same. Accordingly, even if an outsider extracts the system timer value 3a by analyzing the authentication request command 3, his/her access, if tried at a later time by using the same system timer value 3a, does not succeed, whereby the security of communications via the wireless network can be ensured.

Moreover, no authentication server or the like is required, and the invention can therefore be easily applied to small-scale wireless LAN systems based on P-P (Point-to-Point) communication etc.

As for wired LAN techniques, the aforementioned Unexamined Japanese Patent Publication No. 2000-122863 discloses a technique using the system time. According to this technique, however, the time limit for use of the authentication key is checked against the system time and is not used for the judgment of authenticity in the authentication process. Also, the aforementioned Unexamined Japanese Patent Publication No. 2002-259344 discloses using time information. In the disclosed technique, the time information (actual time) and common information are used to generate a "one-time password." Since the actual time can also be set in a device which is not permitted to participate in (connect to) the wireless network, however, such data should not be used as a criterion for the judgment of authenticity of the wireless communication device.

The wireless communication authentication device 1 may additionally be provided with the following functions:

(1) The wireless communication authentication device 1 may be adapted to additionally make a comparison of a system number set in common in devices that are permitted to participate in the wireless network, besides the comparison of the system timer value, so that the comparison results may be reflected in the judgment of authenticity. Specifically, the wireless communication authentication device 1 holds in advance a system number set in common in devices which are allowed to participate in the wireless network. The authentication request command includes the system number held by the wireless communication device 2 and indicative of the wireless network which the wireless communication device can participate in. On receiving the authentication request command, the wireless communication authentication device 1 determines whether or not the system number held by the wireless communication device 2 coincides with the system number held thereby, to judge whether to authenticate the wireless communication device 2. This prohibits a wireless communication device with a different system number from connecting to the wireless network, whereby illegal use of the wireless network can be prevented more securely.

(2) The wireless communication authentication device 1 may be adapted to perform authentication by means of encrypted communication, besides the authentication by means of the system timer value. Specifically, when the authentication by means of information included in the authentication request command meets with success, the wireless communication authentication device 1 generates a random number. Then, using an encryption key set in common in devices that are permitted to participate in the wireless network, the wireless communication authentication device 1 encrypts the random number. The wireless communication authentication device 1 transmits the encrypted random number to the wireless communication device 2. On receiving response data thereafter from the wireless communication device 2, the wireless communication authentication device 1 decrypts the response data by using the encryption key. Further, the wireless communication authentication device 1 compares random number part data included in the decrypted response data with the random number and judges authenticity of the wireless communication device 2 by determining whether or not the random number part data coincides with the random number. This prevents a wireless communication device not holding the predetermined encryption key from participating in the wireless network, even if the system timer value is discovered by an outsider, making it possible to enhance the security of the wireless network.

(3) The wireless communication authentication device 1 may be adapted to decide an encryption algorithm in accordance with the system timer value when performing the authentication by means of encrypted communication. Specifically, the wireless communication authentication device 1 determines an encryption algorithm in accordance with the system timer value and encrypts the random number by using the determined encryption algorithm. Thus, where the authentication process is repeatedly performed, different encryption algorithms are used for the encryption, making it difficult for an outsider to analyze the communicated data.

(4) The wireless communication authentication device 1 may be adapted to set a time limit for the response data to be received from the wireless communication device 2 when performing the authentication by means of encrypted communication. Specifically, if the time elapsed from the transmission of the encrypted random number to the reception of response data from the wireless communication device 2 exceeds a predetermined response requirement time, the wireless communication authentication device 1 judges that the authentication by means of response data has failed. This allows an outsider little time to analyze the communicated data, thus enhancing security.

(5) The wireless communication authentication device 1 may be adapted to perform encrypted communication with the authenticated wireless communication device 2. Specifically, if the wireless communication device 2 is authenticated by the whole authentication process necessary for participation in the wireless network, the wireless communication authentication device 1 generates an encryption key for communication and transmits same to the wireless communication device. Then, the wireless communication authentication device 1 communicates data encrypted by using the communication encryption key, with the wireless communication device 2 via the wireless network. This prevents an outsider from participating in the wireless network by pretending that he/she is accessing from an authenticated wireless communication device.

(6) The wireless communication authentication device 1 may be adapted to periodically authenticate the wireless communication device 2. Specifically, the wireless communication authentication device 1 repeatedly performs the authentication process for the wireless communication device 2 at regular intervals and, each time the authentication process is performed, generates a communication encryption key with a different value. By generating a different communication encryption key each time the authentication process is performed, it is possible to prevent an outsider from decrypting the encryption key.

(7) The wireless communication authentication device 1 may be adapted to disconnect the link to the wireless communication device 2 via the wireless network if the wireless communication device fails to be authenticated in at least part of the authentication process necessary for participation in the wireless network. This serves to lighten the communication load on the wireless network.

(8) The wireless communication authentication device 1 may be adapted to unconditionally reject connection of the wireless communication device 2 which has failed to be authenticated a predetermined number of times. Specifically, if the wireless communication device fails to be authenticated in at least part of the authentication process necessary for participation in the wireless network, the wireless communication authentication device 1 records identification information uniquely identifying the wireless communication device as well as a failure count. After the failure count exceeds a predetermined value, the wireless communication authentication device 1 disconnects the link to the wireless communication device 2 via the wireless network without responding to the authentication request command from the wireless communication device 2. This makes it possible to restrict the chance of outsiders' illegal access, thereby enhancing security.

(9) If the number of devices connected via the wireless network has already reached a predefined maximum connectable number when the authentication request command is received from the wireless communication device 2, the wireless communication authentication device 1 can disconnect the link to the wireless communication device. This serves to reduce the processing load on the wireless communication authentication device 1 and permits data to be communicated at stable throughput.

(10) The wireless communication authentication device 1 may be adapted to judge that the system timer values coincide with each other, if a predetermined number of high order digits of the system timer value held thereby coincides with that of the system timer value of the wireless communication device 2. This admits of setting error of the system timer value in the wireless communication device 2.

(11) The wireless communication authentication device 1 may be provided with the function of the slave station (the function of the wireless communication device 2). This is equivalent to providing the wireless communication device 2 with the function of the master station (the function of the wireless communication authentication device 1). Specifically, when communication with the wireless communication device 2 is to be performed via the wireless network in response to the user's input operation but if the wireless communication device 2 is not authenticated yet, the wireless communication authentication device 1 transmits an authentication request command including its own system timer value to the wireless communication device. Thus, in the case of a wireless network system in which communication is performed without previously defining the master station-slave station relationship (ad hoc mode), the wireless communication authentication device 1 can act as a master station or a slave station as needed. For example, if the wireless communication authentication device issues an authentication request command earlier than the wireless communication device, then the wireless communication authentication device acts as a slave station.

(12) In the case where the wireless communication authentication device 1 is provided with the function of the slave station (the function of the wireless communication device 2), the wireless communication authentication device may be adapted to decide an authentication operation mode in accordance with unique numerical values exchanged with the wireless communication device 2. Specifically, when communication with the wireless communication device 2 is to be performed via the wireless network in response to the user's input operation but if the wireless communication device 2 is not authenticated yet, the wireless communication authentication device 1 exchanges unique numerical values with the wireless communication device 2. If the result of comparison between the quantities of the unique numerical values fulfills a predetermined condition, the wireless communication authentication device 1 transmits an authentication request command including its system timer value to the wireless communication device 2. Where MAC addresses are used as the unique numerical values, the authentication operation mode is uniquely determined depending on the other party of communication, making it possible to prevent the authentication process from becoming more complicated than necessary.

The foregoing are exemplary functions that can be incorporated into the wireless communication authentication device 1. Similarly, the wireless communication device 2 also may be additionally provided with various functions as stated below.

(1) If the authentication by means of the authentication request command fails, the wireless communication device 2 can acquire the remote system timer value set in the wireless communication authentication device, synchronize its local system timer value with the acquired remote system timer value, and transmit an authentication request command again. This makes it possible to keep the communication sustainable even in a situation where the radio wave propagation state of the wireless communication area is poor. This function may be executed only in the case where the authentication steps other than the authentication by means of the system timer value succeeded, for example, thereby preventing lowering in security.

(2) In cases where communication via the wireless network is continued, the wireless communication device 2 may generate a random number (e.g., a two-digit number in hexadecimal) each time the authentication request command is transmitted so that the next authentication request command may be transmitted after a lapse of a time dependent on the generated random number. This causes the authentication request command to be transmitted at irregular intervals while the authentication process is repeatedly performed, whereby an outsider is prevented from illegally acquiring the authentication request command and thus from analyzing the system timer value.

In this manner, the wireless communication authentication device 1 and the wireless communication device 2 may be additionally provided with various functions to enhance security.

The wireless communication authentication device 1 can be implemented by a wireless LAN access point, which is a device having the function of connecting a wireless LAN to other networks such as a wired LAN. In the following, the wireless LAN access point will be merely referred to as access point.

Where the access point is provided with the function of the wireless communication authentication device 1, the wireless communication device 2 functions as a client of the access point. Specific embodiments of the present invention will be now described wherein the invention is applied, by way of example, to a wireless LAN connecting an access point and a client.

First Embodiment

A first embodiment will be described first.

Figure 2:
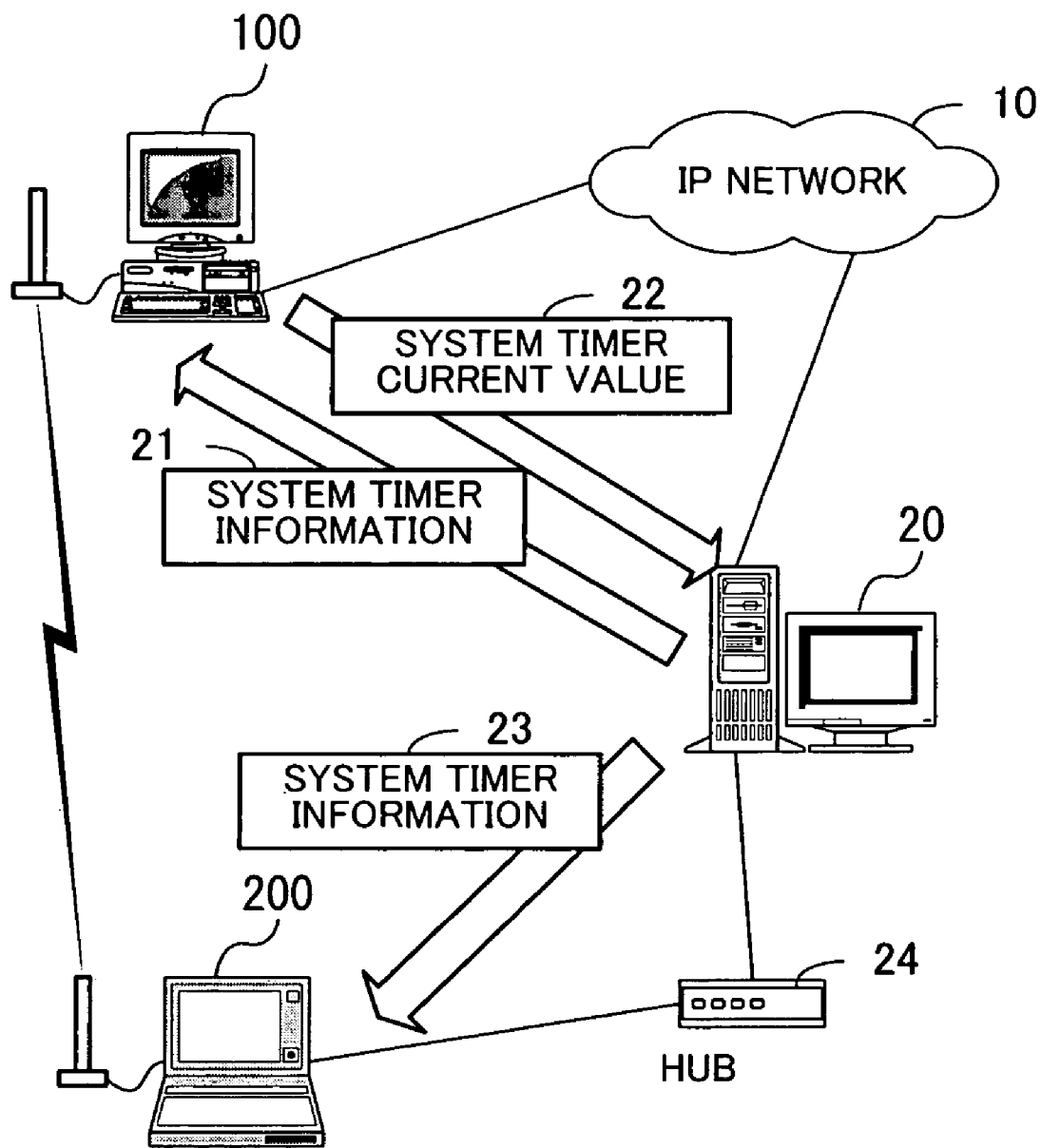
FIG. 2 shows an exemplary system configuration according to the present invention.

FIG. 2 shows an exemplary system configuration according to the present invention. An access point 100 and a client 200 are connected by a wireless LAN, and the access point 100 is also connected to a setting terminal device 20 via an IP network 10. The setting terminal device 20 is connected to the client 200 via a hub 24.

The access point 100 is a computer which functions as a master station in the wireless LAN environment. The client 200 is a computer which functions as a slave station in the wireless LAN environment.

The setting terminal device 20 is a computer which takes care of initial settings of the access point 100 and the client 200 necessary for participation in the wireless LAN. For example, the setting terminal device 20 transmits system timer information 21 (including a system timer value and a system number) to the access point 100 and receives a system timer current value 22 from the access point 100. The system number is identification information which is set in common in devices connectable to the wireless LAN via the access point 100. The setting terminal device 20 also transmits the system timer information 23 to the client 200.

After completion of the initial settings, the setting terminal device 20 is not used any longer. Namely, during operation of the wireless LAN, the setting terminal device 20 need not be connected to the access point 100 or the client 200.

Each of the devices shown in FIG. 2 may be constituted by an ordinary computer.

Figure 3:
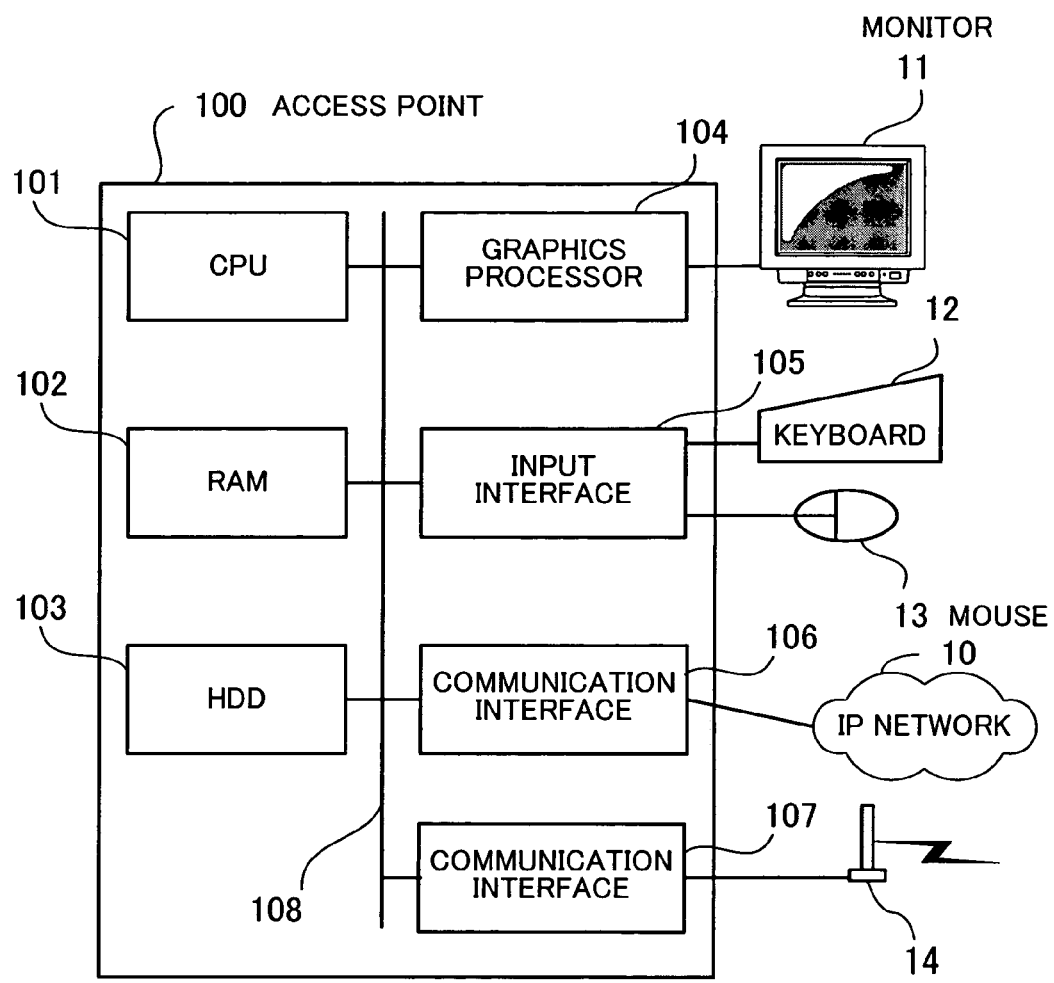
FIG. 3 shows an exemplary hardware configuration of an access point used in the embodiments of the present invention.

FIG. 3 shows an exemplary hardware configuration of the access point used in the embodiment of the present invention. The access point 100 is in its entirety under the control of a CPU (Central Processing Unit) 101. To the CPU 101 are connected, via a bus 108, a RAM (Random Access Memory) 102, an HDD (Hard Disk Drive) 103, a graphics processor 104, an input interface 105, and communication interfaces 106 and 107.

The RAM 102 temporarily stores at least part of OS (Operating System) and application programs executed by the CPU 101. Also, the RAM 102 stores various other data necessary for the processing by the CPU 101. The HDD 103 stores the OS and application programs.

The graphics processor 104 is connected with a monitor 11. In accordance with instructions from the CPU 101, the graphics processor 104 displays images on the screen of the monitor 11. The input interface 105 is connected with a keyboard 12 and a mouse 13, and sends signals from the keyboard 12 and the mouse 13 to the CPU 101 via the bus 108.

The communication interface 106 is connected to the IP network 10 and permits data to be exchanged with other computers via the IP network 10.

The communication interface 107 is connected with an antenna 14. The communication interface 107 is connected to the wireless LAN via the antenna 14 and permits data to be exchanged with the client 200 by wireless.

The processing function of the embodiment can be implemented by the hardware configuration described above. Although FIG. 3 shows the hardware configuration of the access point 100, the client 200 and the setting terminal device 20 may also have a similar hardware configuration.

When configuring a wireless LAN environment in the aforementioned system, the setting terminal device 20 first performs an initial value setting process for the access point 100 and the client 200. The initial value setting is carried out first with respect to the access point 100. Specifically, the setting terminal device 20 transmits the system timer information 21 to the access point 100 as the master station.

Figure 4:
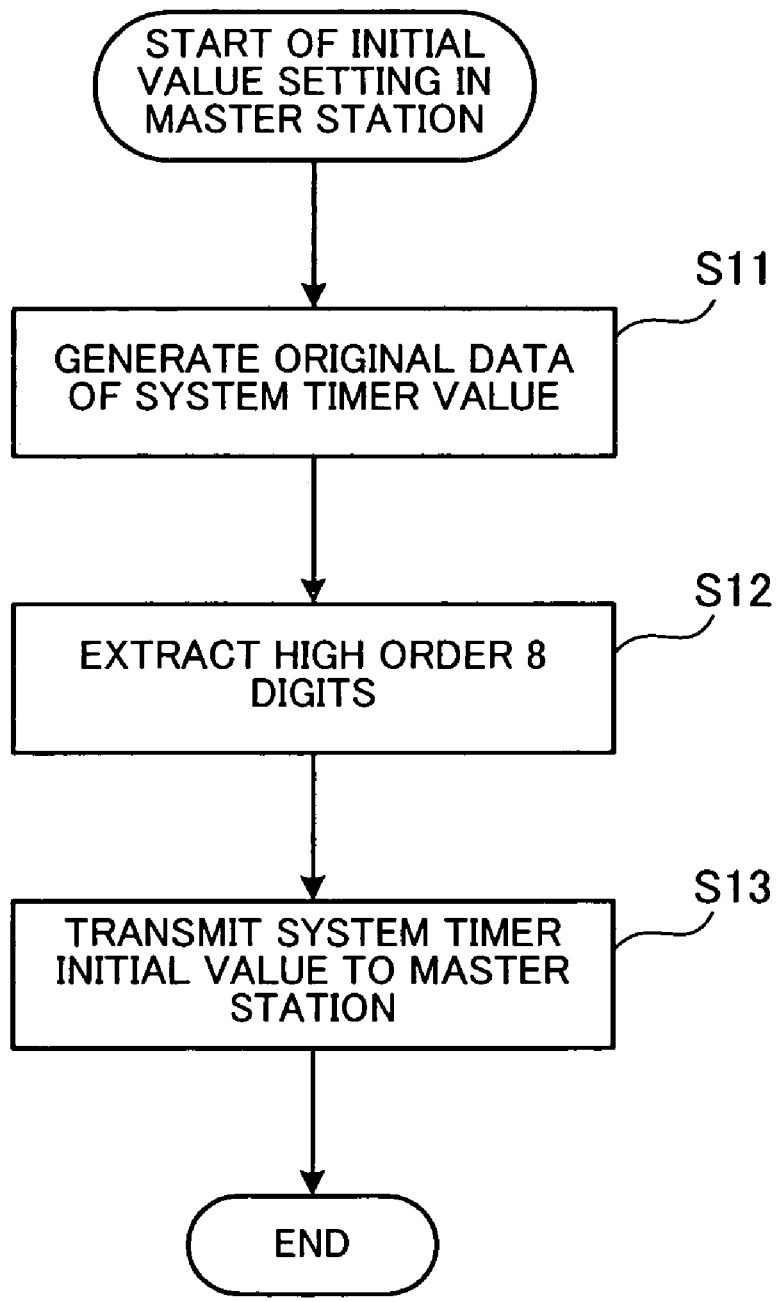
FIG. 4 is a flowchart illustrating a process performed by a setting terminal device to set an initial value in a master station.

FIG. 4 is a flowchart illustrating the process performed by the setting terminal device to set an initial value in the master station. In the following, the process shown in FIG. 4 will be explained in order of step number.

STEP S11: Using the setting terminal device 20, the system administrator generates original data of the system timer value. The generated data is, for example, an optional 10-digit number expressed in hexadecimal notation (e.g., "A32ED97132").

STEP S12: The setting terminal device 20 extracts the high order eight digits (e.g., "A32ED971") of the generated data.

STEP S13: The setting terminal device 20 transmits an initial value of the system timer value to the access point 100 as the master station via the IP network 10 or other wired network, whereby the initial value (e.g., "A32ED971") of the system timer value is set in the access point 100.

The initial value of the system timer value is included, along with other information, in the system timer information 21 to be transmitted.

Figure 5:
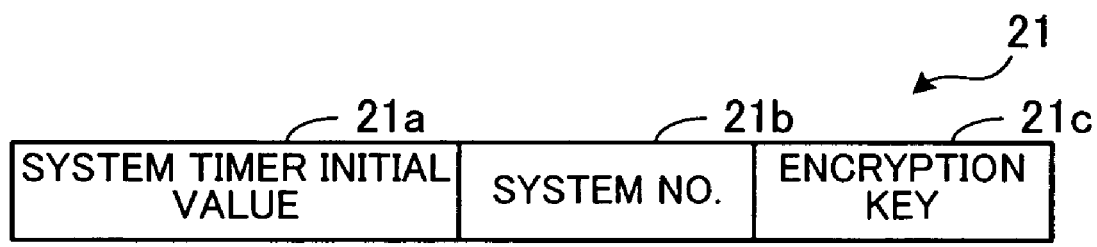
FIG. 5 shows an exemplary data structure of system timer information.

FIG. 5 shows an exemplary data structure of the system timer information. The system timer information 21 contains the system timer initial value 21a, a system number 21b, and an encryption key 21c. The system timer initial value 21a is the initial value of the system timer value to be set in the access point 100 and the client 200 and is, for example, a randomly generated four-byte number. For the system number 21b, an identification number assigned to each area of the wireless LAN is set. For example, a common identification number is set in the access point 100 and the client 200 which can participate in the wireless LAN via the access point 100. The encryption key 21c is a key for encryption used when performing authentication by means of encrypted communication.

On receiving the system timer information 21, the access point 100 stores the individual items contained in the system timer information 21. The access point 100 then sets the system timer initial value 21a as its system timer value and increments the set value as time elapses. Specifically, the access point 100 increments the system timer value with lapse of every second. Thus, the access point 100 is now in a standby state ready to receive a connection request from the client 200.

Subsequently, using the setting terminal device 20, the system administrator sets the initial value in the client 200 as the slave station.

Figure 6:
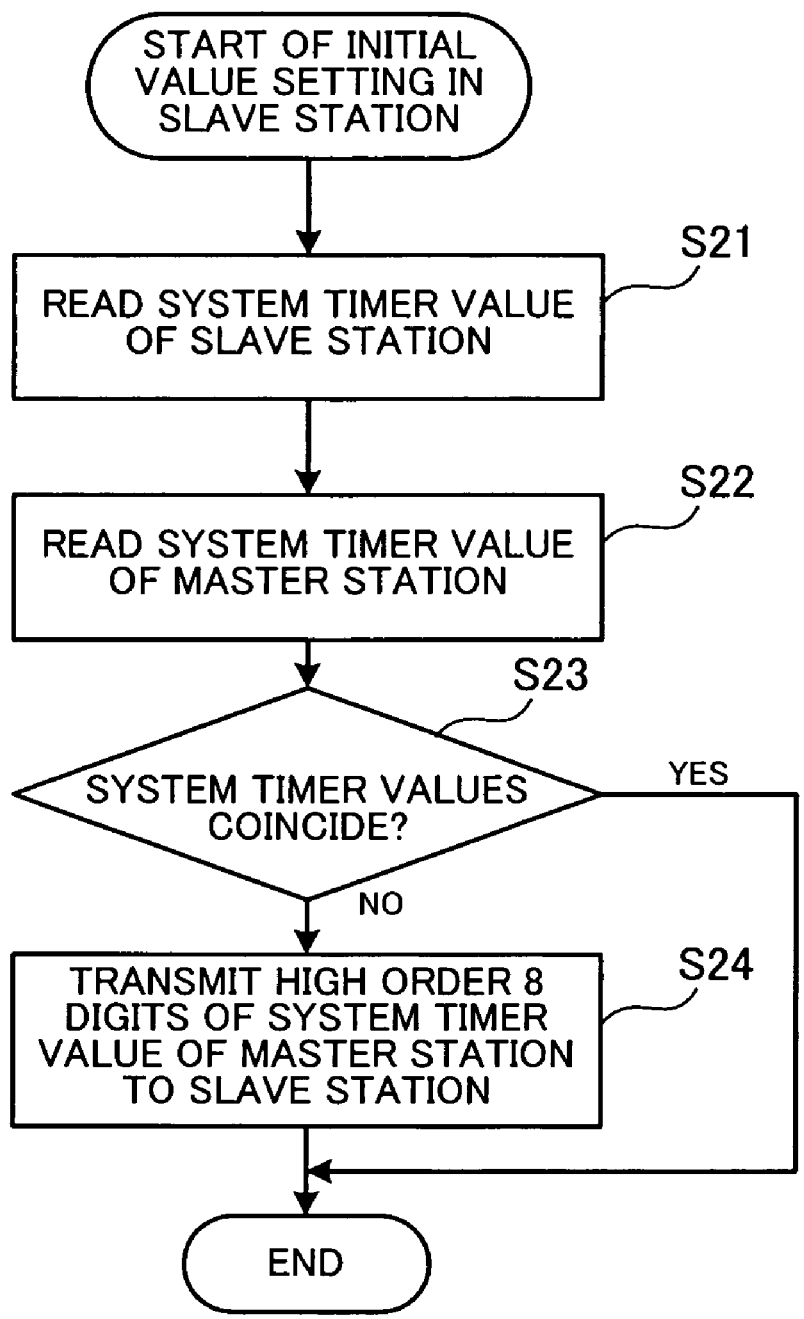
FIG. 6 is a flowchart illustrating a process performed by the setting terminal device to set an initial value in a slave station.

FIG. 6 is a flowchart illustrating the process performed by the setting terminal device to set the initial value in the slave station. In the following, the process shown in FIG. 6 will be explained in order of step number.

STEP S21: The setting terminal device 20 reads out the system timer value set in the client 200 as the slave station.

STEP S22: The setting terminal device 20 reads out the system timer value (system timer current value 22) set in the access point 100 as the master station.

STEP S23: The setting terminal device 20 determines whether or not the system timer values acquired in Steps S21 and S22 coincide with each other. If the two values coincide, the process ends; if not, the process proceeds to Step S24.

STEP S24: The setting terminal device 20 transmits, to the slave station, the high order eight digits of the system timer value of the access point 100 as the master station. Specifically, the system timer information 23 including the system timer value is transmitted to the client 200. The data structure of the system timer information 23 set in the client 200 is identical with that shown in FIG. 3. The values of the system number and encryption key of the system timer information 23 transferred to the client 200 are equal to those of the system number and encryption key in the system timer information 21 transferred to the access point 100.

On receiving the system timer information 23, the client 200 stores the individual items contained in the system timer information 23. At this time, the system timer current value 22 included in the system timer information 23 is set as the system timer value of the client 200. The set system timer value is incremented with lapse of every second.

The following describes the functions of the access point 100 and the client 200 for carrying out wireless LAN communication.

Figure 7:
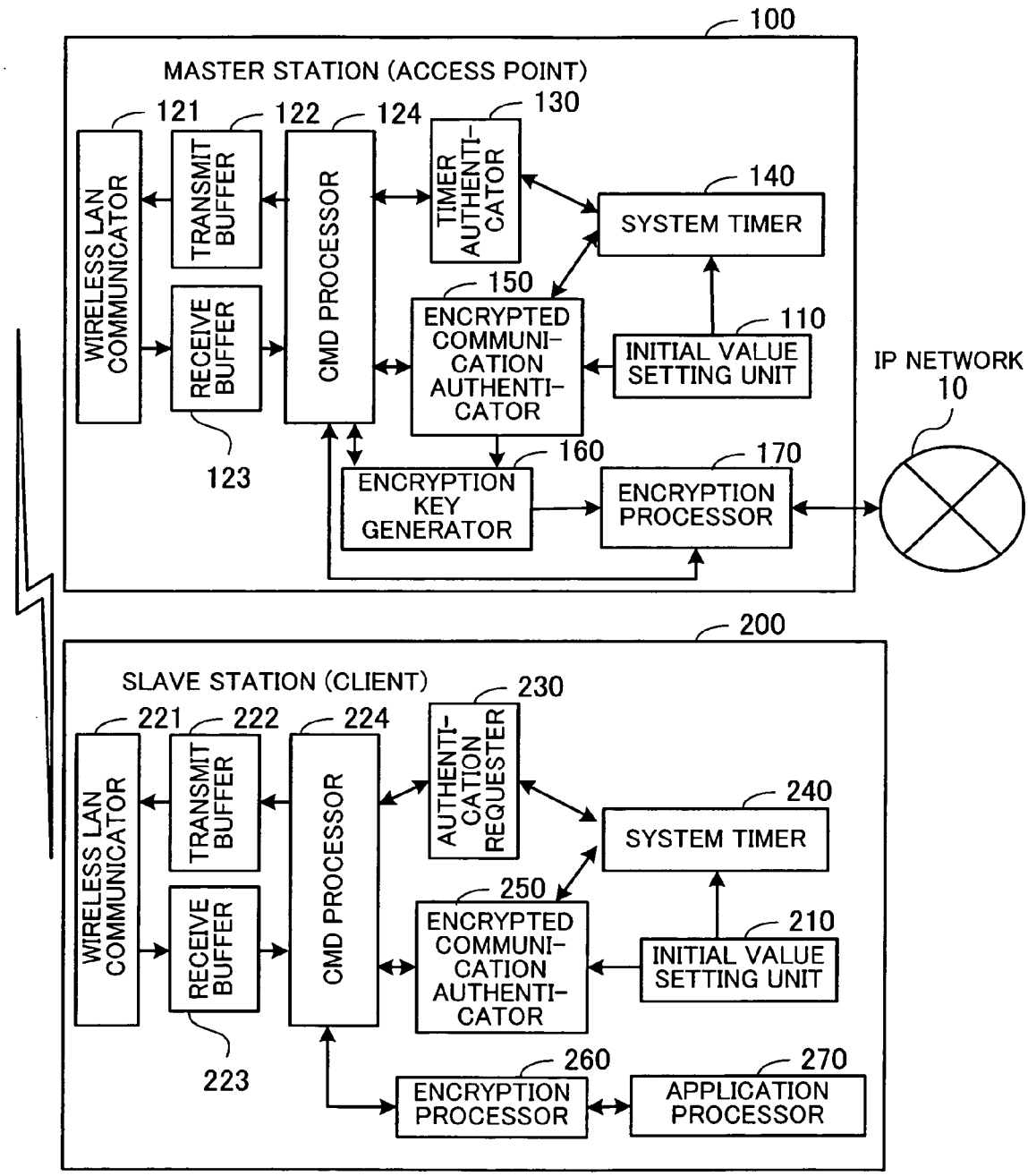
FIG. 7 is a block diagram illustrating the functions of the access point and a client.

FIG. 7 is a block diagram illustrating the functions of the access point and the client. The access point 100, as the master station, includes an initial value setting unit 110, a wireless LAN communicator 121, a transmit buffer 122, a receive buffer 123, a command (CMD) processor 124, a timer authenticator 130, a system timer 140, an encrypted communication authenticator 150, an encryption key generator 160, and an encryption processor 170.

The initial value setting unit 110 receives the system timer information 21 from the setting terminal device 20 and sets the initial value included therein. Specifically, the initial value setting unit 110 sets, in the system timer 140, the system timer initial value 21a and the system number 21b included in the system timer information 21. Also, the initial value setting unit 110 transfers the encryption key 21c to the encrypted communication authenticator 150.

The wireless LAN communicator 121 performs wireless LAN communication with the client 200 as the slave station. The transmit buffer 122 is an interface buffer for temporarily holding data to be transmitted via the wireless LAN. The receive buffer 123 is an interface buffer for temporarily holding data received via the wireless LAN. The command processor 124 analyzes commands in the data received from the client 200, such as an authentication request, and generates commands for data to be transmitted to the client 200.

The timer authenticator 130 authenticates the client 200 by using the system timer value attached to the authentication request command from the client 200. Specifically, on receiving the authentication request command from the client 200, the timer authenticator 130 acquires the system timer current value and the system number from the system timer 140.

Then, the timer authenticator 130 compares the system timer value received from the client 200 with the system timer value received from the system timer 140, to determine whether the two coincide or not. The system timer values are regarded as coincident with each other if the difference therebetween falls within a predetermined allowable error range. Simultaneously, the timer authenticator 130 compares the system number received from the client 200 with the system number received from the system timer 140, to determine whether the two coincide or not. If both the system timer values and the system numbers respectively coincide, the timer authenticator 130 notifies the encrypted communication authenticator 150 that the timer authentication succeeded.

The system timer 140 manages the system timer value of the access point 100. Specifically, the system timer 140 holds, as the system timer value, the system timer initial value transferred from the initial value setting unit 110. Also, the system timer 140 holds the system number received from the initial value setting unit 110. The system timer 140 increments the system timer value, which is an eight-digit number in hexadecimal, with every lapse of a predetermined time (e.g., one second).

After completion of the timer authentication, the encrypted communication authenticator 150 authenticates the client 200 by using data encrypted in accordance with a predetermined encryption scheme. Specifically, on receiving a notification of successful timer authentication from the timer authenticator 130, the encrypted communication authenticator 150 first generates a random number. Then, the encrypted communication authenticator 150 encrypts the generated random number by using the encryption key received from the initial value setting unit 110. The encrypted communication authenticator 150 transmits the encrypted random number (encrypted data) to the client 200 as the slave station.

Encrypted data is thereafter received from the client 200. The encrypted communication authenticator 150 measures the time elapsed from the transmission of the encrypted data therefrom, to determine whether or not the response data is received within a predetermined time (e.g., one minute). If the response data is received within the predetermined time, the encrypted communication authenticator 150 decrypts the response data. Then, the encrypted communication authenticator 150 compares the random number part in the decrypted data with the previously generated random number. If the random numbers coincide, the encrypted communication authenticator 150 judges that the encrypted communication authentication succeeded, and thus notifies the encryption key generator 160 of successful authentication.

On receiving a notification of successful authentication from the encrypted communication authenticator 150, the encryption key generator 160 generates an encryption key to be used for the communication with the client 200. Then, the encryption key generator 160 transmits the generated encryption key to the client 200 and also transfers same to the encryption processor 170. The encryption key generated by the encryption key generator 160 is used to encrypt and decrypt communication data and thus, strictly speaking, is an encryption/decryption key.

Using the encryption key received from the encryption key generator 160, the encryption processor 170 performs encrypted communication with the client 200. Also, in response to a request from the client 200, the encryption processor 170 communicates with client via the IP network 10. A term of validity is set for the encryption key, and after the term expires, the encryption key is not usable any longer. Namely, the client 200 repeatedly performs the authentication process at time intervals shorter than the validity term of the encryption key.

The client 200, as the slave station, includes an initial value setting unit 210, a wireless LAN communicator 221, a transmit buffer 222, a receive buffer 223, a command (CMD) processor 224, an authentication requester 230, a system timer 240, an encrypted communication authenticator 250, an encryption processor 260, and an application processor 270.

The initial value setting unit 210 receives the system timer information 23 from the setting terminal device 20 and sets the initial value included therein. Specifically, the initial value setting unit 210 sets, in the system timer 240, the system timer initial value and the system number included in the system timer information 23. Also, the initial value setting unit 210 transfers the encryption key to the encrypted communication authenticator 250.

The wireless LAN communicator 221 performs wireless LAN communication with the access point 100 as the master station. The transmit buffer 222 is an interface buffer for temporarily holding data to be transmitted via the wireless LAN. The receive buffer 223 is an interface buffer for temporarily holding data received via the wireless LAN. The command processor 224 analyzes commands received from the access point 100 and generates commands for data to be transmitted to the access point 100.

The authentication requester 230 issues an authentication request command to the access point 100, as the master station, in response to the user's input operation or a request from the access point 100. Specifically, the authentication requester 230 acquires the then-assumed system timer value and the system number from the system timer 240. The authentication requester 230 then generates an authentication request command including the system timer value and the system number, and transmits the generated command to the access point 100. The authentication request command is periodically issued at predetermined intervals of time while the communication via the wireless LAN is continued.

The system timer 240 manages the system timer value of the client 200. Specifically, the system timer 240 holds, as the system timer value, the system timer initial value transferred from the initial value setting unit 210. Also, the system timer 240 holds the system number received from the initial value setting unit 210. The system timer 240 increments the system timer value, which is an eight-digit number in hexadecimal, with every lapse of the predetermined time (e.g., one second).

After the authentication request command is transmitted, the encrypted communication authenticator 250 performs the authentication process in cooperation with the access point 100 by using data encrypted according to the predetermined encryption scheme. Specifically, on receiving the encrypted data from the access point 100, the encrypted communication authenticator 250 decrypts the data by using the encryption key received from the initial value setting unit 210. Then, using the encryption key, the encrypted communication authenticator 250 encrypts the decrypted data (random number), together with the system number and the identification number of the client 200, for example. The encrypted communication authenticator 250 transmits the encrypted data to the access point 100 as the master station.

The encryption processor 260 performs encrypted communication with the master station. Specifically, the encryption processor 260 holds the encryption key transmitted from the access point 100. On receiving a data transmission request from the application processor 270, the encryption processor 260 encrypts data by using the encryption key, and transmits the encrypted data via the access point 100. Also, on receiving data destined for the application processor 270, the encryption processor 260 decrypts the data by using the encryption key, and transfers the decrypted data to the application processor 270.

The application processor 270 performs a required process in response to the user's input operation. When a process requiring data communication via the network needs to be executed, the application processor 270 transfers a data communication request to the encryption processor 260. Then, the application processor 270 receives the results of data communication from the encryption processor 260.

Figure 8:
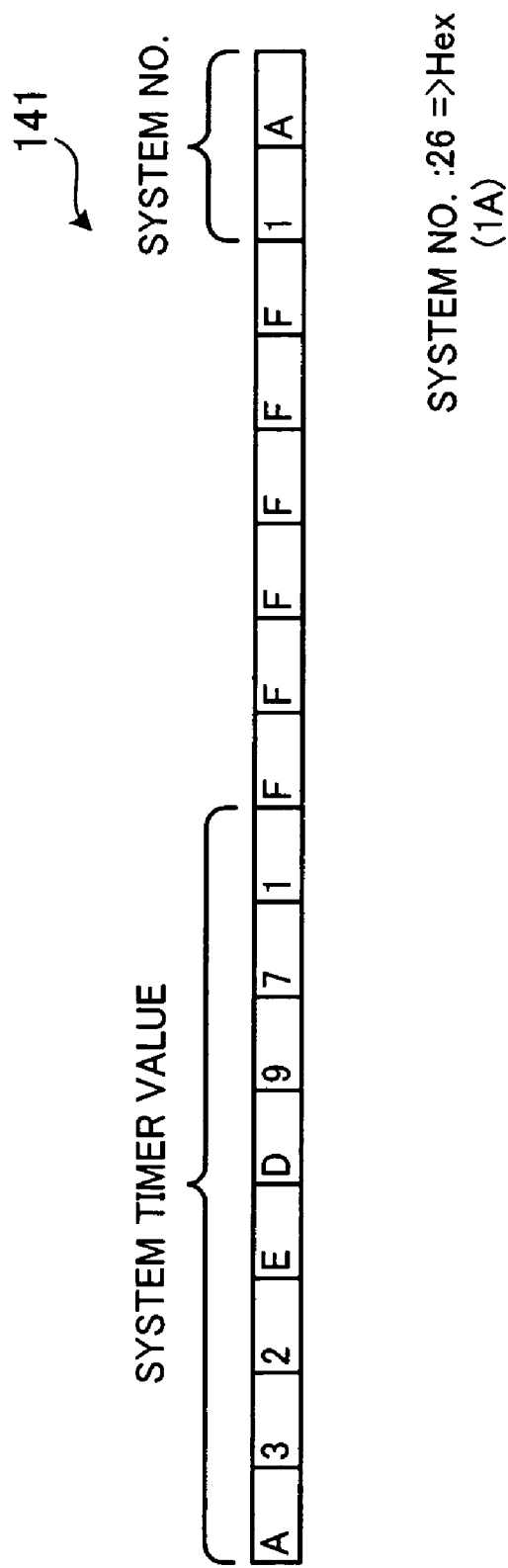
FIG. 8 shows an exemplary data structure of data held by a system timer of the access point.

FIG. 8 shows an exemplary data structure of the data held by the system timer of the access point. In the example of FIG. 8, the system timer 140 has an eight-byte data storage area 141 therein. The system timer value is set in the first four bytes of the data storage area, and the system number is set in the last one byte of the data storage area. In the illustrated example, the system number is "26" (decimal), and its equivalent number obtained by hexadecimal conversion, that is, "1A" is set. In the data storage area, storage locations labeled "F" are a reserve area for future expansion.

The data stored in the data storage area of the system timer 240 of the client 2.00 also has an identical data structure.

Between the access point 100 and the client 200 configured as described above, the authentication process is performed to determine whether or not the client 200 is qualified to participate in the wireless LAN.

Figure 9:
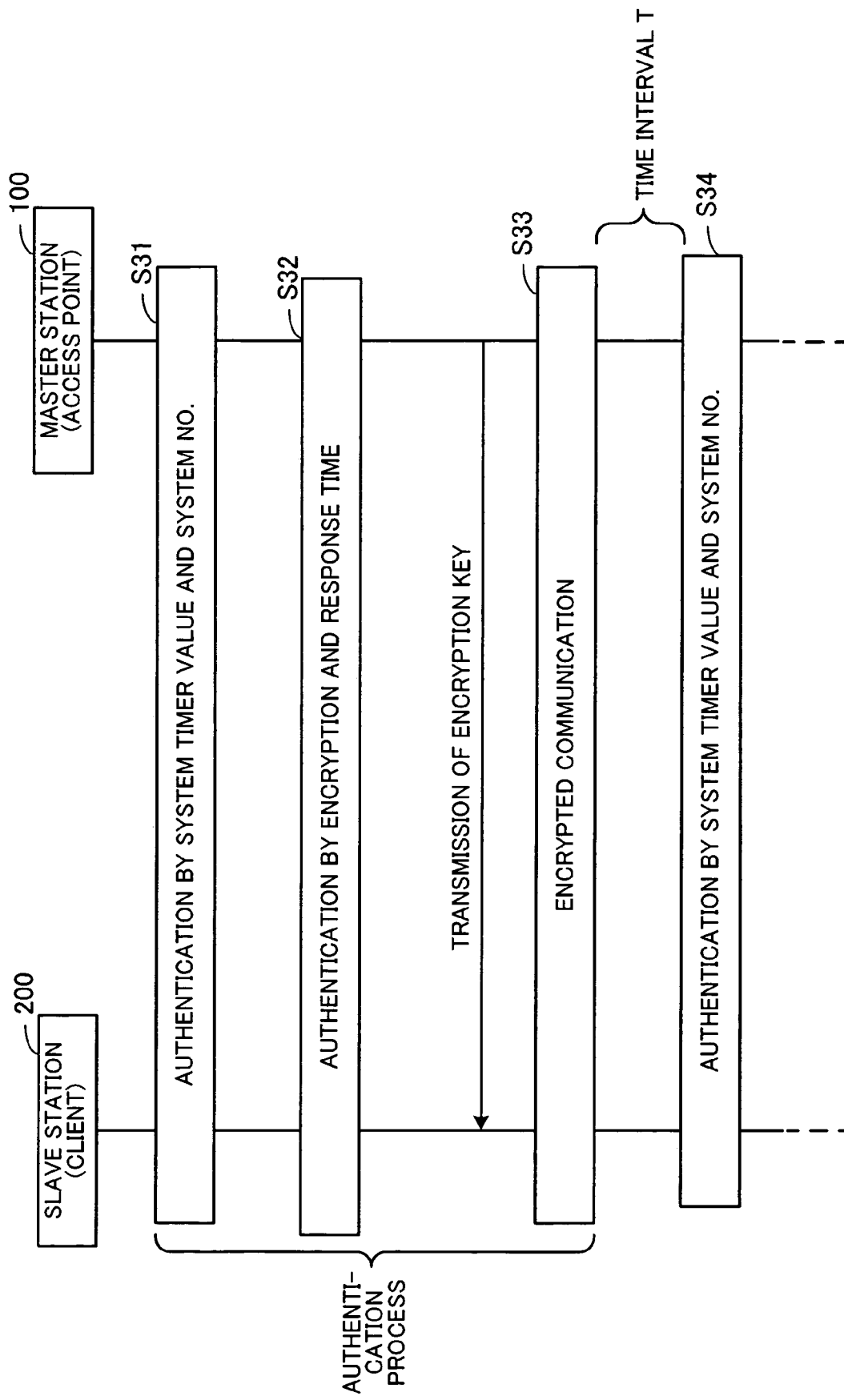
FIG. 9 is a sequence diagram illustrating an authentication process.

FIG. 9 is a sequence diagram illustrating the authentication process. In the following, the process shown in FIG. 9 will be explained in order of step number.

STEP S31: In response to an authentication request from the client 200 as the slave station, authentication by means of the system number is performed between the client 200 and the access point 100.

Specifically, an authentication request command is sent from the authentication requester 230 of the client 200 to the access point 100. The authentication request command, which contains the system timer value and system number stored in the system timer 240, is received by the timer authenticator 130 of the access point 100. The timer authenticator 130 acquires the system timer value and the system number from the system timer 140 and collates the acquired data with the system timer value and system number included in the authentication request command. If the data agrees, it is judged that the timer authentication succeeded.

STEP S32: Authentication by means of encryption and response time is carried out between the client 200 and the access point 100.

Specifically, the encrypted communication authenticator 150 of the access point 100 generates a random number and then encrypts the generated random number by using a predetermined encryption algorithm and the encryption key previously held thereby. The encrypted data is sent to the client 200.

At the client 200, the encrypted communication authenticator 250 receives the encrypted data and then decrypts the data by using the encryption key previously held thereby. Further, the client 200 encrypts the decrypted data (random number), along with the identification information of the client 200, by using the encryption key and transmits the encrypted data to the access point 100.

The encrypted data from the client 200 is received by the encrypted communication authenticator 150 of the access point 100 and decrypted by the encryption key held thereby. Then, the encrypted communication authenticator 150 compares the value of the random number contained in the decrypted data with the value of the previously generated random number. If, as a result of the comparison, the two are found to be in agreement, it is judged that the client 200 identified by the identification information included in the decrypted data is authentic.

Where the authentication by means of encrypted communication meets with success, the encryption key generator 160 generates an encryption key. The generated encryption key is transferred to the encryption processor 170 and is also transmitted to the client 200. At the client 200, the encryption key is transferred to the encryption processor 260 and is held thereby.

STEP S33: Encrypted communication is performed between the access point 100 and the client 200 via the wireless LAN.

Specifically, in the client 200, the application processor 270 issues a data communication request to the encryption processor 260, whereupon the encryption processor 260 encrypts the contents of the request and transmits the encrypted data to the access point 100. At the access point 100, the encryption processor 170 decrypts the encrypted request and transmits the decrypted data via the IP network 10.

When data destined for the client 200 is received via the IP network 10, the encryption processor 170 of the access point 100 encrypts the received data and transmits the encrypted data to the client 200. At the client 200, the received data is decrypted by the encryption processor 260 and then transferred to the application processor 270.

STEP S34: After a lapse of a predetermined time T (e.g., 30 seconds) from the encrypted communication in Step S33 and before subsequent communication, the authentication process of Steps S31 and S32 is again performed, and on completion of the authentication process, encrypted data is communicated.

Figure 10:
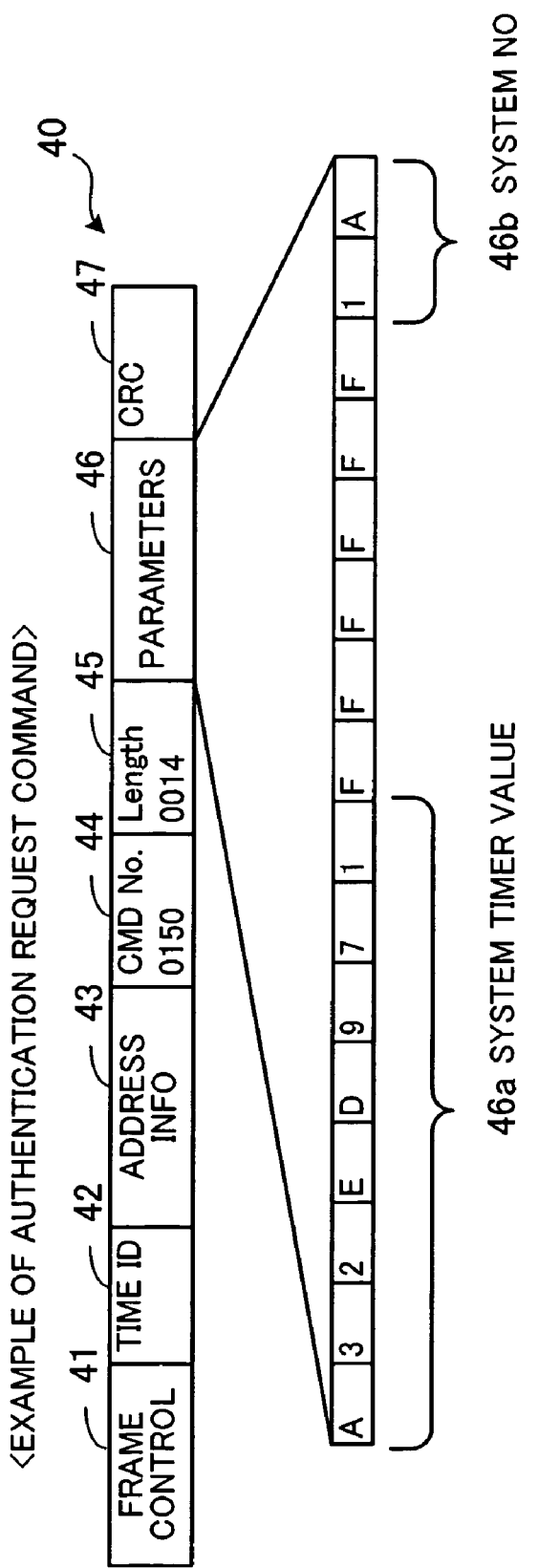
FIG. 10 shows an exemplary data structure of an authentication request command transmitted from the client to the access point.

FIG. 10 shows an exemplary data structure of the authentication request command transmitted from the client to the access point. The authentication request command 40 includes fields for frame control 41, time ID 42, address information 43, command number (CMD No.) 44, data length (Length) 45, parameters 46, and CRC (Cyclic Redundancy Check) 47.

The frame control 41 is information whereby the head of transmitted data (frame) is identified. The time ID 42 indicates a standby time by which the client will be ready to transmit data, and the address information 43 indicates source and destination addresses. The command number (CMD No.) 44 is an identification number indicative of a command type, and in the example of FIG. 10, the identification number of the authentication request command 40 is "0150." The data length (Length) 45 indicates a frame data length. The parameters 46 include data to be transmitted by the authentication request command 40, and the authentication request command 40 contains a system timer value 46a and a system number 46b as the parameters 46. The CRC 47 is a code for checking data correctness.

Figure 11:
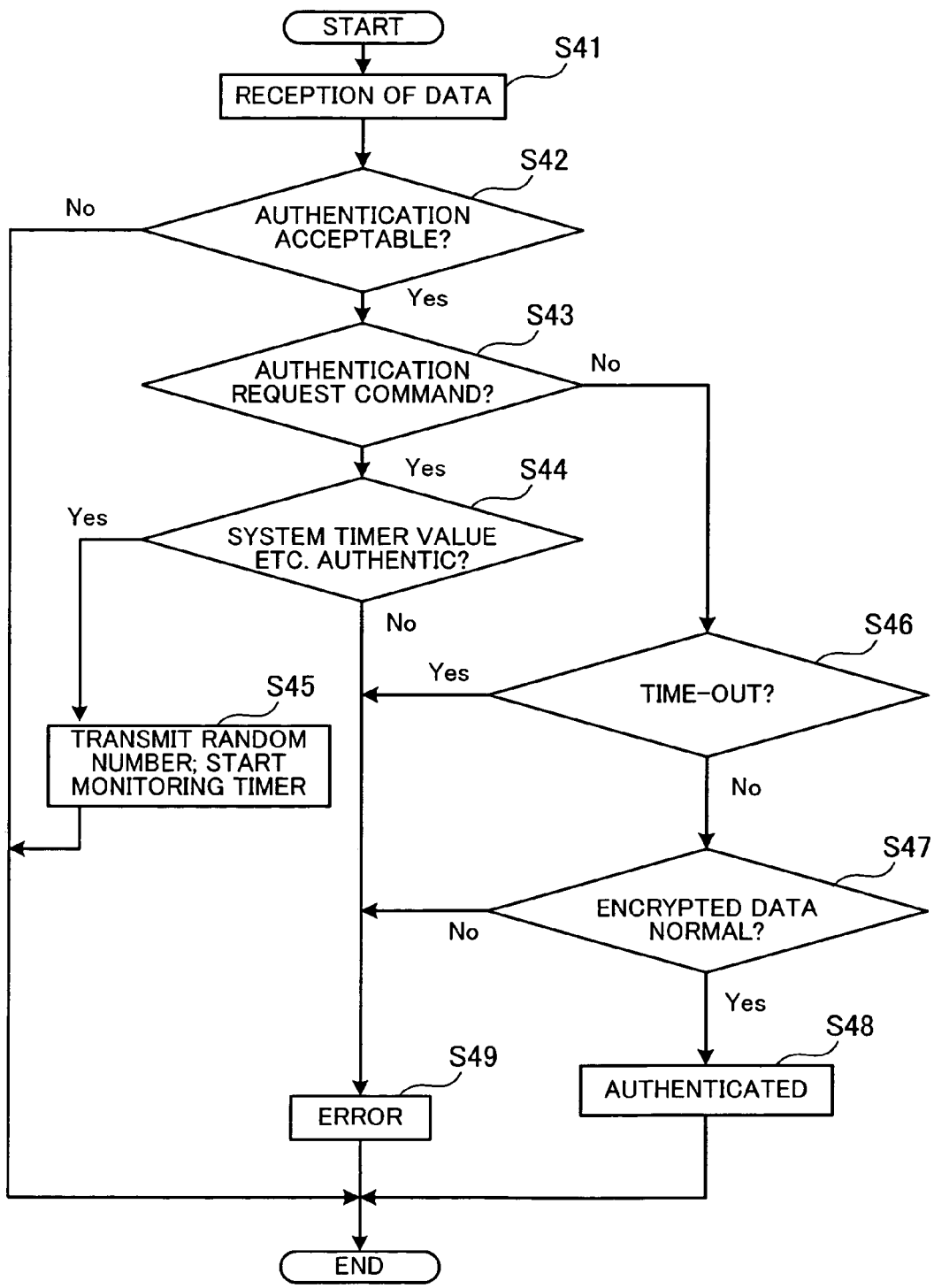
FIG. 11 is a flowchart illustrating an authentication process performed by the access point.

FIG. 11 is a flowchart illustrating the authentication process performed at the access point. In the following, the process shown in FIG. 11 will be explained in order of step number.

STEP S41: The command processor 124 receives data from the client 200.

STEP S42: The command processor 124 determines whether or not the device is in an authentication acceptable state. If the authentication process is acceptable, the process proceeds to Step S43; if not, the process ends. The authentication acceptable state is a state in which the device is waiting for an authentication request command or for encrypted data for the authentication by means of encrypted communication.

STEP S43: The command processor 124 determines whether or not the data received from the client 200 is an authentication request command. If the received data is an authentication request command, the process proceeds to Step S44; if not, the data is judged to be the encrypted data for the authentication by means of encrypted communication, and the process proceeds to Step S46.

STEP S44: Based on the system timer value and system number included in the authentication request command, the timer authenticator 130 determines whether to establish authenticity. If authenticity is established, the process proceeds to Step S45; if not, the process proceeds to Step S49.

STEP S45: The encrypted communication authenticator 150 generates a random number, encrypts the random number, and transmits the encrypted random number to the client 200. At this time, a monitoring timer for measuring the response time is started, and then the process ends.

STEP S46: The encrypted communication authenticator 150 determines whether or not the time measured by the monitoring timer has exceeded the predetermined time (time-out has occurred). If time-out has occurred, the process proceeds to Step S49; if not, the process proceeds to Step S47.

STEP S47: The encrypted communication authenticator 150 determines whether or not the encrypted data is normal. The encrypted data is judged normal if the random number obtained by decrypting the encrypted data is identical with that generated in Step S45. If the encrypted data is normal, the process proceeds to Step S48; if not, the process proceeds to Step S49.

STEP S48: The encrypted communication authenticator 150 judges that the authentication succeeded and notifies the encryption key generator 160 of the success, whereupon the process ends. Encrypted data is thereafter communicated by wireless between the access point 100 and the client 200.

STEP S49: The timer authenticator 130 or the encrypted communication authenticator 150 judges that the authentication failed (ERROR), and the process ends.

In this manner, the authentication process is performed in two stages, namely, the authentication by means of the system timer value and the authentication by means of encryption and response time, and the encryption key is transmitted only to the successfully authenticated slave station (client 200) to permit data communication. Computers with different system timer values are therefore unable to connect to the wireless LAN. Moreover, the authentication process is performed at predetermined intervals of time, and each time the process is performed, a different encryption key is sent to the slave station (client 200). It is therefore possible to configure a secure wireless LAN without using an authentication server.

Namely, in a conventional wireless LAN system not equipped with an authentication server, the encryption key is determined when the system is introduced. The encryption key determined at the time of introduction of the system is manually set in the slave station (client) and the master station (access point) to permit communication. With this method, however, once the encryption key is resolved, the contents of subsequently communicated data can be tapped. Where the communicated data is customer information, for example, data leak leads to a serious security problem.

In a wireless LAN system equipped with an authentication server, the encryption key is periodically changed. However, the authentication process performed between the authentication server on the network and the master station (access point) or the slave station (client) wastes time and increases the network load. Also, in the case of configuring a small-scale wireless LAN system based on P-P (Point-to-Point) communication etc., a problem arises in that the equipment cost is significantly high.

According to the first embodiment, the authentication process and the updating of the encryption key are carried out without using an authentication server, and therefore, the embodiment can be applied also to a small-scale wireless LAN system based on P-P (Point-to-Point) communication etc.

Second Embodiment

A second embodiment will be now described. In the second embodiment, the wireless link is disconnected if the authentication fails.

Figure 12:
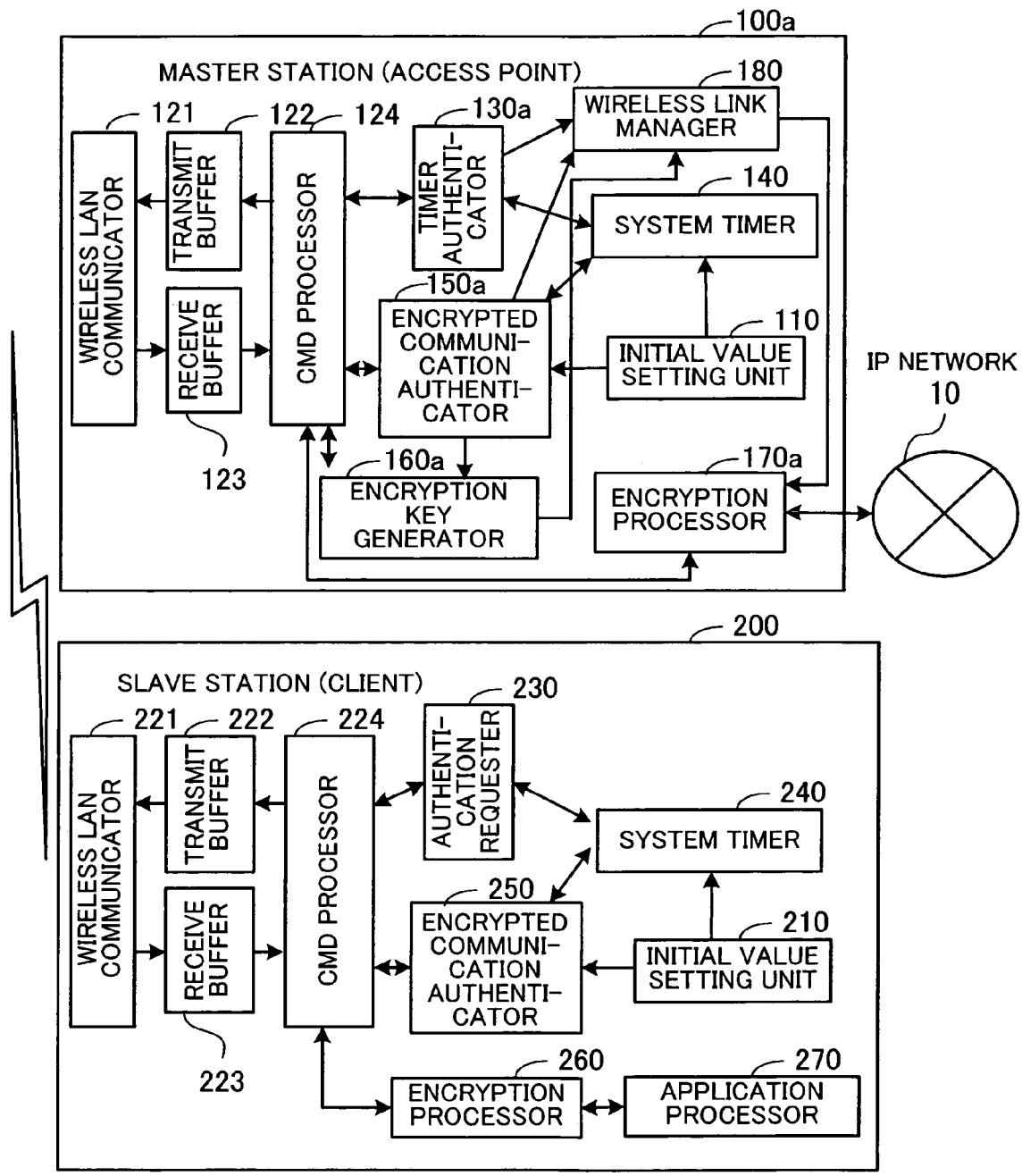
FIG. 12 is a block diagram illustrating the functions of an access point and a client according to a second embodiment.

FIG. 12 is a block diagram illustrating functions of the access point and the client according to the second embodiment. The configuration of the second embodiment is almost identical with that of the first embodiment. In the figure, therefore, identical reference numerals are used to denote elements identical with those of the first embodiment shown in FIG. 7, and description of such elements is omitted.

The second embodiment differs from the first embodiment in the configuration of the access point 100a. Specifically, a wireless link manager 180 is additionally provided. Also, the timer authenticator 130a and the encrypted communication authenticator 150a of the second embodiment operate differently from the corresponding elements of the first embodiment when the authentication failed, and the encryption key generator 160a and the encryption processor 170a of the second embodiment transfer the encryption key in a different manner from the first embodiment.

If the authentication based on the authentication request from the client 200 fails, the timer authenticator 130a or the encrypted communication authenticator 150a instructs the wireless link manager 180 to disconnect (open) the wireless link.

Specifically, the timer authenticator 130a compares the system timer value and system number attached to the authentication request command from the client 200 as the slave station with the contents of the data held by the system timer 140. If at least one of the system timer value and the system number fails to coincide, the timer authenticator 130a judges that the authentication failed and instructs the wireless link manager 180 to disconnect the wireless LAN link.

Similarly, the encrypted communication authenticator 150a performs the authentication by means of encrypted communication after the timer authentication succeeded. If the response fails to reach within the predetermined time or if the random number fails to coincide, the authenticator 150a instructs the wireless link manager 180 to disconnect the wireless LAN link.

The wireless link manager 180 has a slave station management table holding information about the connected client 200. On receiving an instruction to disconnect a wireless LAN link, the wireless link manager 180 disconnects the wireless link to the corresponding client 200 and also deletes the information on the disconnected client from the slave station management table.

On generation of an encryption key, the encryption key generator 160a transfers the generated encryption key to the wireless link manager 180. When encrypted data is received from the client 200 or when data to be transmitted to the client 200 is received, the encryption processor 170a acquires the encryption key associated with the client 200 from the wireless link manager 180. Then, using the encryption key received from the wireless link manager 180, the encryption processor 170a decrypts or encrypts the received data.

FIG. 13 shows an exemplary data structure of the slave station management table. The slave station management table 181 has columns labeled "MAC (Media Access Control) ADDRESS," "AUTHENTICATION STATUS," "AUTHEN-TICATION COUNT," and "ENCRYPTION KEY." The items of information in each row are associated with one another and constitute one record.

In the column "MAC ADDRESS," the MAC address of the slave station connected to the wireless LAN is set by the wireless link manager 180.

In the column "AUTHENTICATION STATUS," the status of the wireless link is set by the wireless link manager 180. The wireless link status includes "AUTHENTICATED," "AUTHENTICATING," etc. The status "AUTHENTICATED" indicates that the authentication has succeeded, and the status "AUTHENTICATING" indicates that the authentication process is being performed.

In the column "AUTHENTICATION COUNT," the number of times the authentication process has been performed is set by the wireless link manager 180. Since the authentication process is periodically performed, the authentication count of the slave station which has been continuously authorized to use the wireless LAN is incremented at periodic intervals.

In the column "ENCRYPTION KEY," the encryption key used for communicating data with the corresponding slave station is stored by the wireless link manager 180. Namely, when an encryption key is generated by the encryption key generator 160a, the wireless link manager 180 acquires the generated encryption key and registers same in the slave station management table 181.

Thus, with respect to each slave station (client 200 etc.) connected to the master station (access point 100), the MAC address, authentication status, authentication count and encryption key are managed by the slave station management table 181. If the authentication fails, the corresponding record is deleted from the slave station management table 181. In the example of FIG. 13, the slave station with the MAC address "00:60:B3:68:4D:99" has been authenticated and is communicating data. The slave station with the MAC address "00:60:B3:59:DD:98" is currently being authenticated, and its authentication count "5" indicates that the authentication process is being repeated. The slave station with the MAC address "00:60:B3:70:3E:91" is currently being authenticated and its authentication count is "0," indicating that the authentication has not succeeded yet.

In the second embodiment, the wireless link manager deletes, from the slave station management table 181, the slave station (client) that failed to be authenticated. Accordingly, if the slave station with the above MAC address ("00:60:B3:70:3E:91") fails to be authenticated, the corresponding record is deleted from the slave station management table 181.

Figure 14:
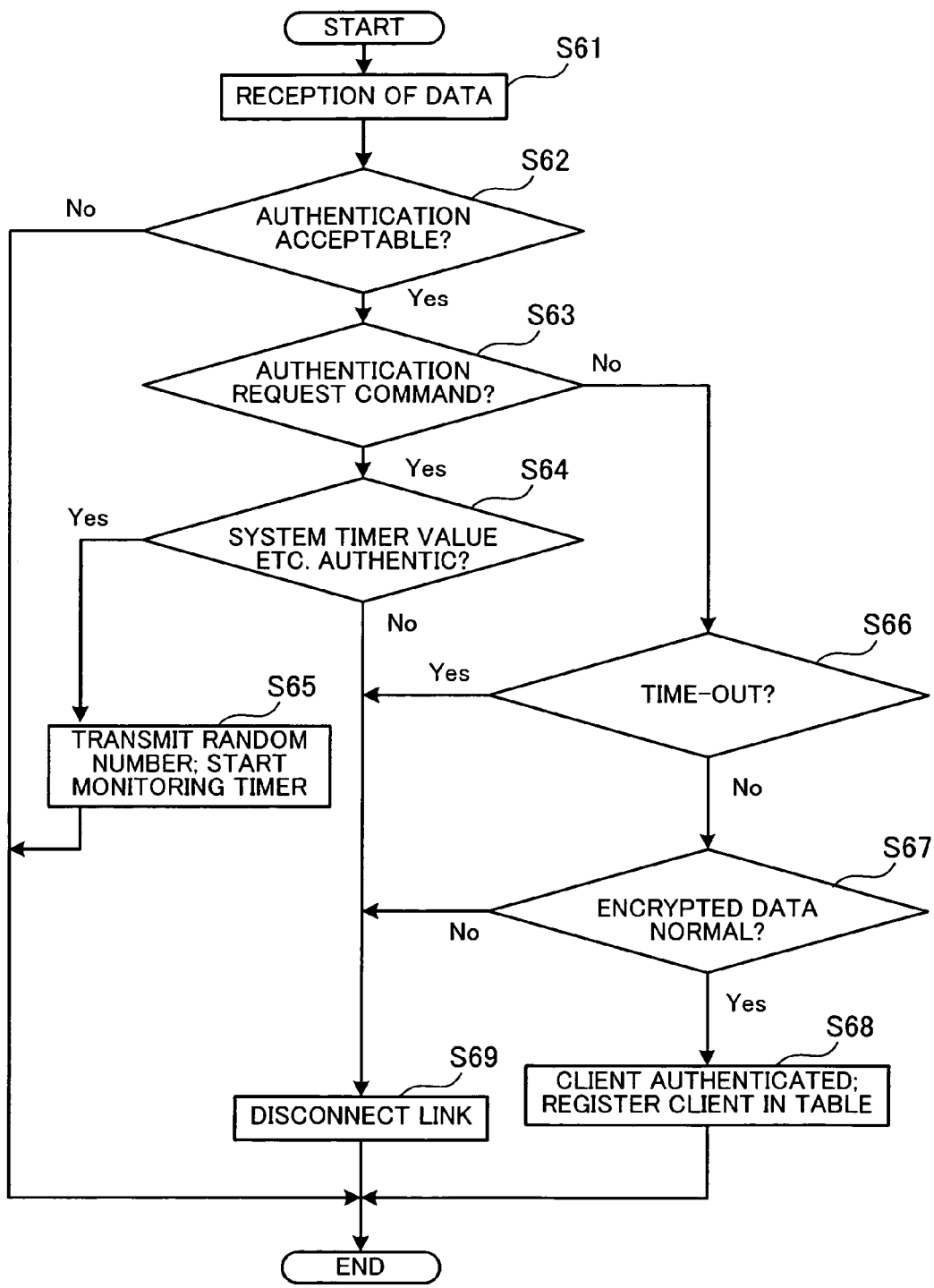
FIG. 14 is a flowchart illustrating an authentication process performed by the access point.

FIG. 14 is a flowchart illustrating the authentication process performed at the access point. In the following, the process shown in FIG. 14 will be explained in order of step number.

STEP S61: The command processor 124 receives data from the client 200.

STEP S62: The command processor 124 determines whether or not the device is in the authentication acceptable state. If the authentication process is acceptable, the process proceeds to Step S63; if not, the process ends. The authentication acceptable state is a state in which the device is waiting for an authentication request command or for encrypted data for the authentication by means of encrypted communication.

STEP S63: The command processor 124 determines whether or not the data received from the client 200 is an authentication request command. If the received data is an authentication request command, the process proceeds to Step S64; if not, the data is judged to be the encrypted data for the authentication by means of encrypted communication, and the process proceeds to Step S66.

STEP S64: Based on the system timer value and system number included in the authentication request command, the timer authenticator 130a determines whether to establish authenticity. If authenticity is established, the process proceeds to Step S65. If authenticity fails to be established, a wireless LAN disconnect instruction is sent to the wireless link manager 180 and the process proceeds to Step S69.

STEP S65: The encrypted communication authenticator 150a generates a random number, encrypts the random number, and transmits the encrypted random number to the client 200. At this time, the monitoring timer for measuring the response time is started, and then the process ends.

STEP S66: The encrypted communication authenticator 150a determines whether or not the time measured by the monitoring timer has exceeded the predetermined time (time-out has occurred). If time-out has occurred, a wireless LAN disconnect instruction is sent to the wireless link manager 180 and the process proceeds to Step S69. If no time-out has occurred, the process proceeds to Step S67.

STEP S67: The encrypted communication authenticator 150a determines whether or not the encrypted data is normal. The encrypted data is judged normal if the random number obtained by decrypting the encrypted data is identical with that generated in Step S65. If the encrypted data is normal, the process proceeds to Step S68. If the encrypted data is not normal, a wireless LAN disconnect instruction is sent to the wireless link manager 180 and the process proceeds to Step S69.

STEP S68: The encrypted communication authenticator 150a judges that the authentication succeeded and notifies the encryption key generator 160a of the success. Also, the wireless link manager 180 registers information about the client 200 in the slave station management table 181, whereupon the authentication process ends. Encrypted data is thereafter communicated by wireless between the access point 100 and the client 200.

STEP S69: The wireless link manager 180 disconnects the wireless link to the client 200 which failed to be authenticated, whereupon the process ends.

In this manner, the link or communication path to a slave station which failed to be authenticated is disconnected, thereby avoiding a situation where a wireless LAN link remains established even though the slave station associated therewith failed to be authenticated, so that the network load can be reduced.

Third Embodiment

A third embodiment will be now described. According to the third embodiment, if a slave station fails to be authenticated a plurality of times, connection of the slave station to the wireless LAN is thereafter prohibited.

Figure 15:
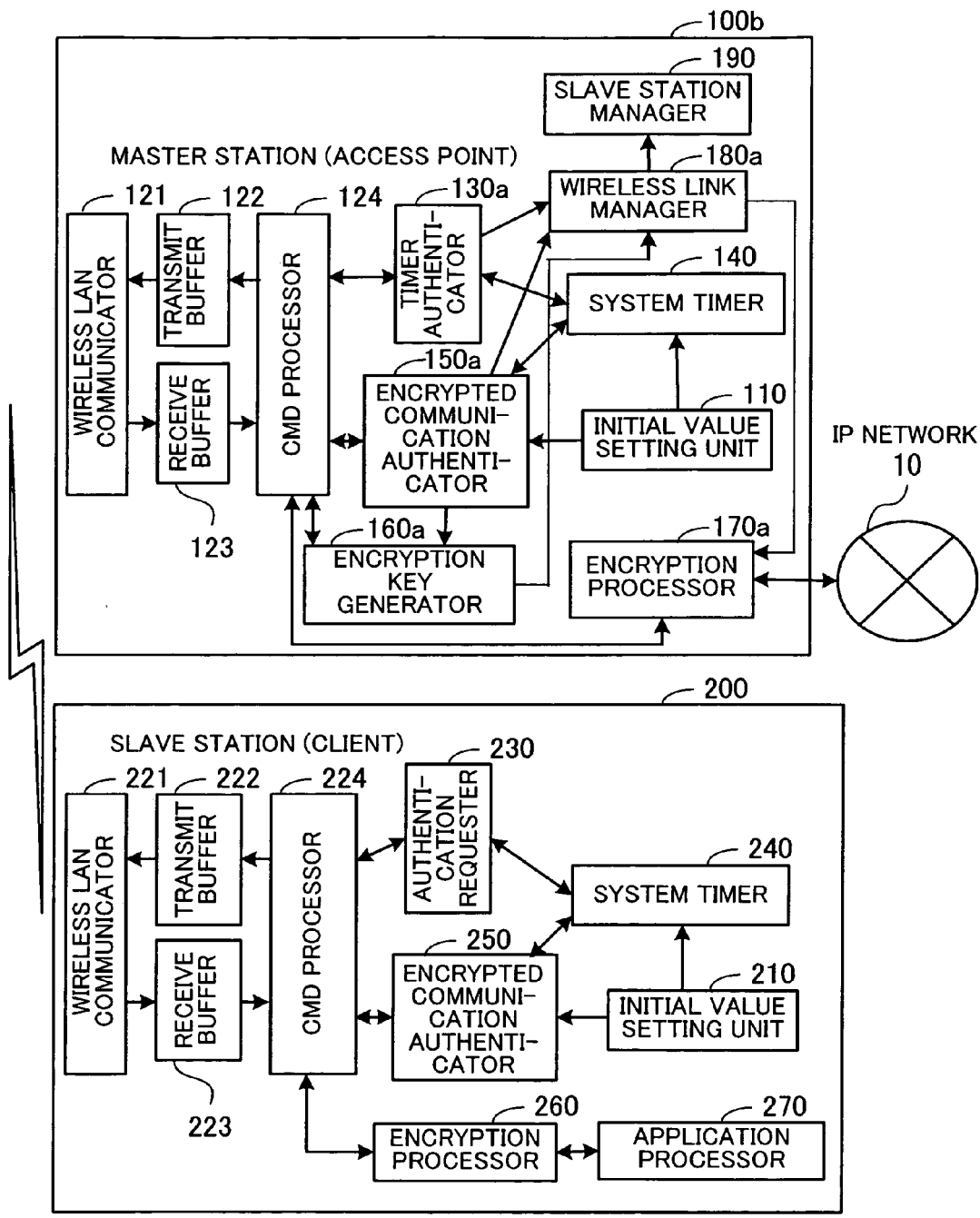
FIG. 15 is a block diagram illustrating the functions of an access point and a client according to a third embodiment.

FIG. 15 is a block diagram illustrating functions of the access point and the client according to the third embodiment. The third embodiment is nearly identical in configuration with the second embodiment. In the figure, therefore, identical reference numerals are used to denote elements identical with those of the second embodiment shown in FIG. 12, and description of such elements is omitted.

The third embodiment differs from the second embodiment in the configuration of the access point 100b. Specifically, the access point is additionally provided with a slave station manager 190. The wireless link manager 180a of the third embodiment and the counterpart of the second embodiment differ from each other in the method of managing the slave station management table.

When a link disconnect instruction is received from the timer authenticator 130a or the encrypted communication authenticator 150a, the wireless link manager 180a increments the count of failure of authentication of the corresponding slave station. The wireless link manager counts, as the failure count, the total number of times the slave station has failed to be authenticated from the first access as well as the latest number of times the slave station consecutively failed to be authenticated. If either of the failure counts exceeds a corresponding predetermined number, the wireless link manager 180a notifies the slave station manager 190 of the MAC address of the corresponding slave station.

The slave station manager 190 registers, in its slave station refusal management table, the identification information (MAC address) of a slave station whose connection should be refused. When an authentication request command or the like is received from the slave station whose connection should be refused, the slave station manager 190 does not respond to such access and disconnects the wireless LAN link.

FIG. 16 shows an exemplary data structure of the slave station management table according to the third embodiment. The slave station management table 182 of the third embodiment is almost identical with the slave station management table 181 of the second embodiment, shown in FIG. 13, and is additionally provided with the columns labeled "RECEPTION COUNT" and "CONSECUTIVE FAILURE COUNT."

In the column "RECEPTION COUNT," the number of times the authentication request command has been received is set by the wireless link manager 180a. In the column "CONSECUTIVE FAILURE COUNT," the number of times the authentication failed consecutively is set by the wireless link manager 180a.

In the second embodiment, the record on a slave station which failed to be authenticated is deleted from the slave station management table 181, but in the third embodiment, the record is kept even if the slave station associated therewith fails to be authenticated. In this case, the consecutive failure count of the slave station which failed to be authenticated is incremented.

If the authentication consecutively meets with success, the authentication count and reception count of the corresponding slave station should coincide with each other. On the other hand, if the authentication fails, the reception count and consecutive failure count of the corresponding slave station are incremented. At this time, if the difference between the reception count and the authentication count reaches a predetermined value (e.g., "5"), the slave station manager 190 is notified of the MAC address of the corresponding slave station. Similarly, if the consecutive failure count reaches a predetermined value (e.g., "3"), the slave station manager 190 is notified of the MAC address of the corresponding slave station. If the authentication succeeds after failure, the consecutive failure count is initialized to "0."

FIG. 17 shows an exemplary data structure of the slave station refusal management table. The slave station refusal management table 191 has columns labeled "MAC ADDRESS" and "REGISTRATION TIME." The items of information in each row are associated with each other and constitute one record.

In the column "MAC ADDRESS," the MAC address of a slave station whose authentication failure count has reached the predetermined value and thus whose connection should be refused is set by the slave station manager 190. In the column "REGISTRATION TIME," the time at which the MAC address was registered is set by the slave station manager 190.

As shown in FIG. 16, with respect to each slave station connected to the master station (access point 100), the MAC address, authentication status, reception count (of the authentication request command) and encryption key are managed by the slave station management table 182. In the example of FIG. 16, the slave station with the MAC address "00:60:B3: 70:3E:91" is being authenticated (authentication count: 0) and its authentication command reception count is "3." This means that the authentication has been attempted three times but all attempts ended in failure. It can therefore be judged that there is a strong possibility that an unauthorized slave station (client) is trying to establish connection (spoofing) by illegally using the MAC address leaked from the system.

Thus, to prevent the connection (including the authentication) of the slave station (client), the MAC address "00:60: B3:70:3E:91" of the slave station is registered in the slave station refusal management table 191. Once the MAC address is registered, the slave station manager 190 does not respond to the authentication request command from the registered slave station and disconnects the wireless LAN link. The spoofed slave station (client) changes its MAC address (wireless LAN card is changed), whereby a secure communication environment can be restored.

Figure 18:
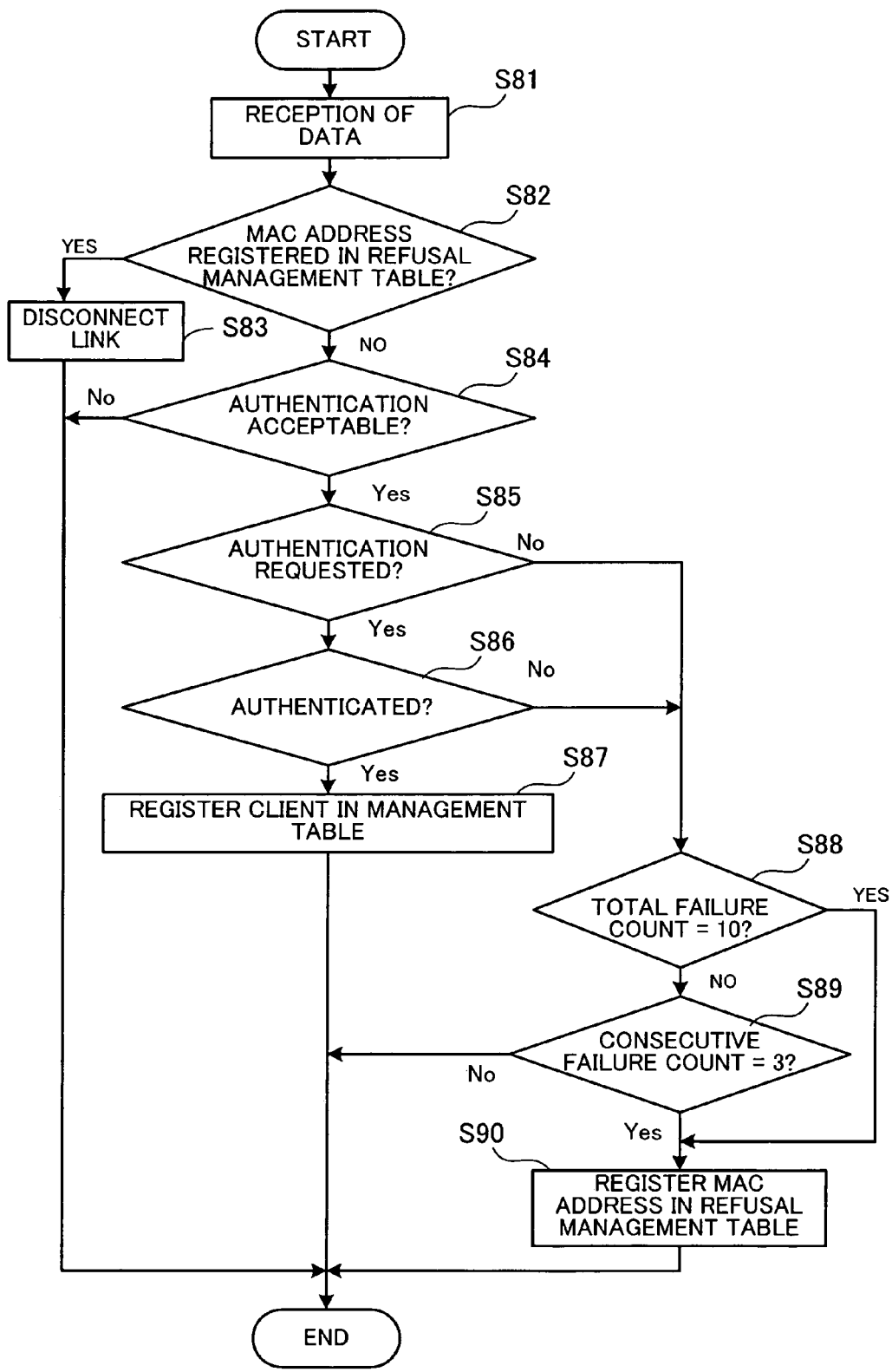
FIG. 18 is a flowchart illustrating a process according to the third embodiment.

FIG. 18 is a flowchart illustrating the process according to the third embodiment. In the following, the process shown in FIG. 18 will be explained in order of step number.

STEP S81: The command processor 124 receives data from the client 200.

STEP S82: The slave station manager 190 determines whether or not the MAC address of the client 200 from which the data has been received is registered in the slave station refusal management table. If the MAC address is registered, the process proceeds to Step S83; if not, the process proceeds to Step S84.

STEP S83: The slave station manager 190 disconnects the link to the client 200, whereupon the process ends.

STEP S84: The command processor 124 determines whether or not the device is in the authentication acceptable state. If the authentication process is acceptable, the process proceeds to Step S85; if not, the process ends. The authentication acceptable state is a state in which the device is waiting for an authentication request command or for encrypted data for the authentication by means of encrypted communication.

STEP S85: The command processor 124 determines whether or not the data received from the client 200 is data requesting authentication. Data requesting authentication is either an authentication request command or encrypted data for the authentication by means of encrypted communication. If the received data is authentication requesting data, the process proceeds to Step S86; if not, the process proceeds to Step S88.

STEP S86: The timer authenticator 130a and the encrypted communication authenticator 150a perform the authentication process with respect to the client 200. The authentication process is identical in content with that performed in the second embodiment. If the authentication succeeds (client is authenticated), the process proceeds to Step S87; if the authentication fails, the process proceeds to Step S88.

STEP S87: The wireless link manager 180a registers information about the client 200 in the slave station management table 182. If the client is already registered, the client is not additionally registered but the corresponding consecutive failure count in the registered record is reset to "0," whereupon the process ends.

STEP S88: The wireless link manager 180a determines whether or not the total failure count (difference between the authentication count and the reception count) has reached "10." If "10" is reached, the process proceeds to Step S90; if not, the process proceeds to Step S89.

STEP S89: The wireless link manager 180a determines whether or not the consecutive failure count has reached "3." If "3" is reached, the process proceeds to Step S90; if not, the process ends.

STEP S90: The slave station manager 190 registers the MAC address of the client 200 in the slave station refusal management table 191. Subsequently, the slave station manager 190 disconnects the wireless LAN link to the client 200, whereupon the process ends.

In this manner, a spoofing terminal is prevented from intruding into the wireless LAN system, thereby ensuring higher security of the wireless LAN system.

Fourth Embodiment

A fourth embodiment will be now described. According to the fourth embodiment, if the authentication fails due to disagreement of the system timer value, the timers are synchronized.

Figure 19:
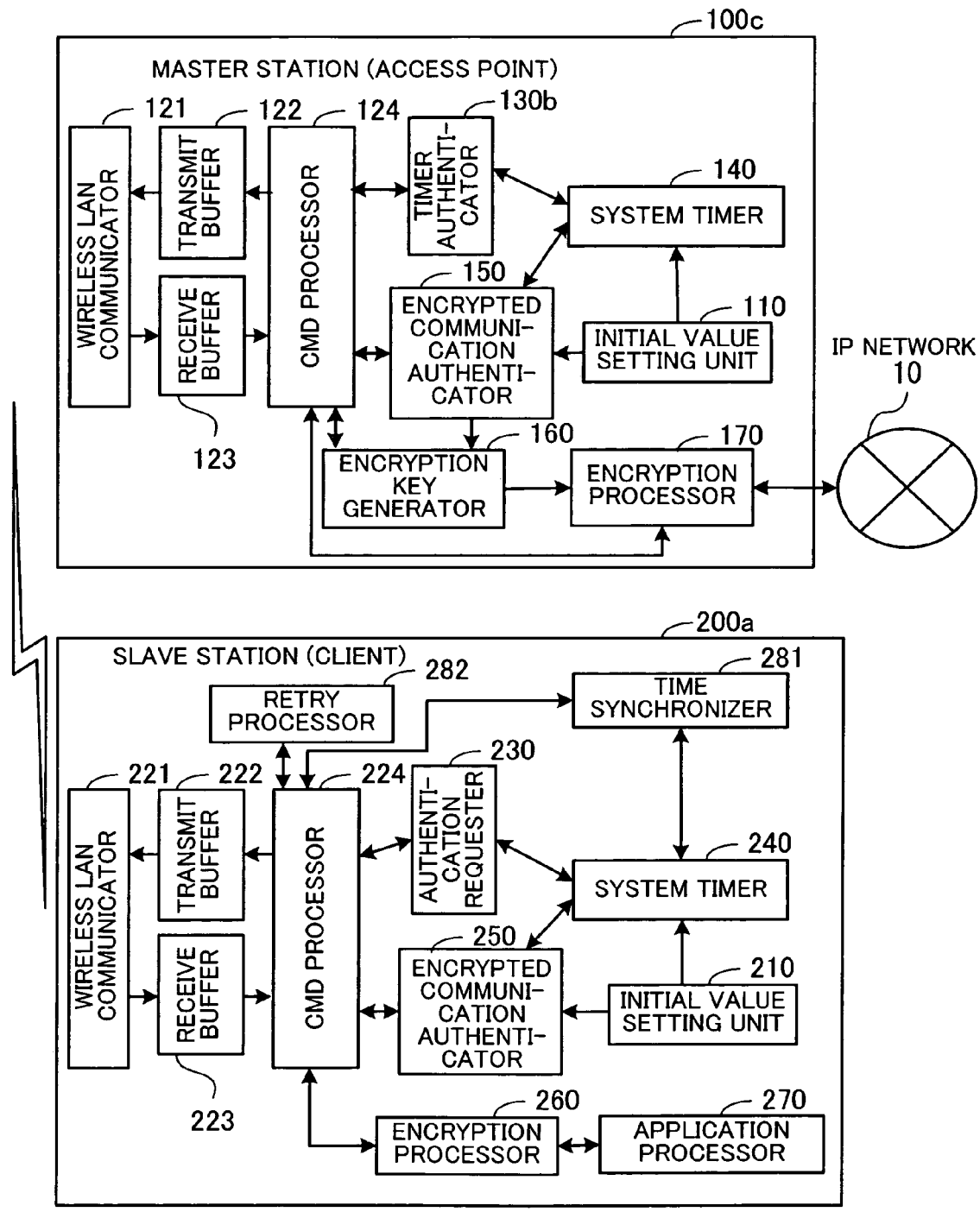
FIG. 19 is a block diagram illustrating the functions of an access point and a client according to a fourth embodiment.

FIG. 19 is a block diagram illustrating functions of the access point and the client according to the fourth embodiment. The fourth embodiment is almost identical in configuration with the first embodiment. In the figure, therefore, identical reference numerals are used to denote elements identical with those of the first embodiment shown in FIG. 7, and description of such elements is omitted.

In the fourth embodiment, the access point 100c and the client 200a are configured differently from those of the first embodiment. Specifically, the access point 100c differs from the counterpart of the first embodiment in that the timer authenticator 130b has the function of transmitting the system timer value in response to a request from the client 200a. Also, the client 200a is additionally provided with a time synchronizer 281 and a retry processor 282.

When notified of the failure of the timer authentication due to disagreement of the system timer value, the time synchronizer 281 sends a time inquiry command to the access point 100c. Then, on receiving a response to the time inquiry command from the access point 100c, the time synchronizer 281 transfers the system timer value received from the access point 100c to the system timer 240 so that the system timer value of the client 200a may be synchronized with the received system timer value.

After the system timer value is synchronized by the time synchronizer 281, the retry processor 282 again generates an authentication request command and transmits the generated command to the access point 100c.

Figure 20:
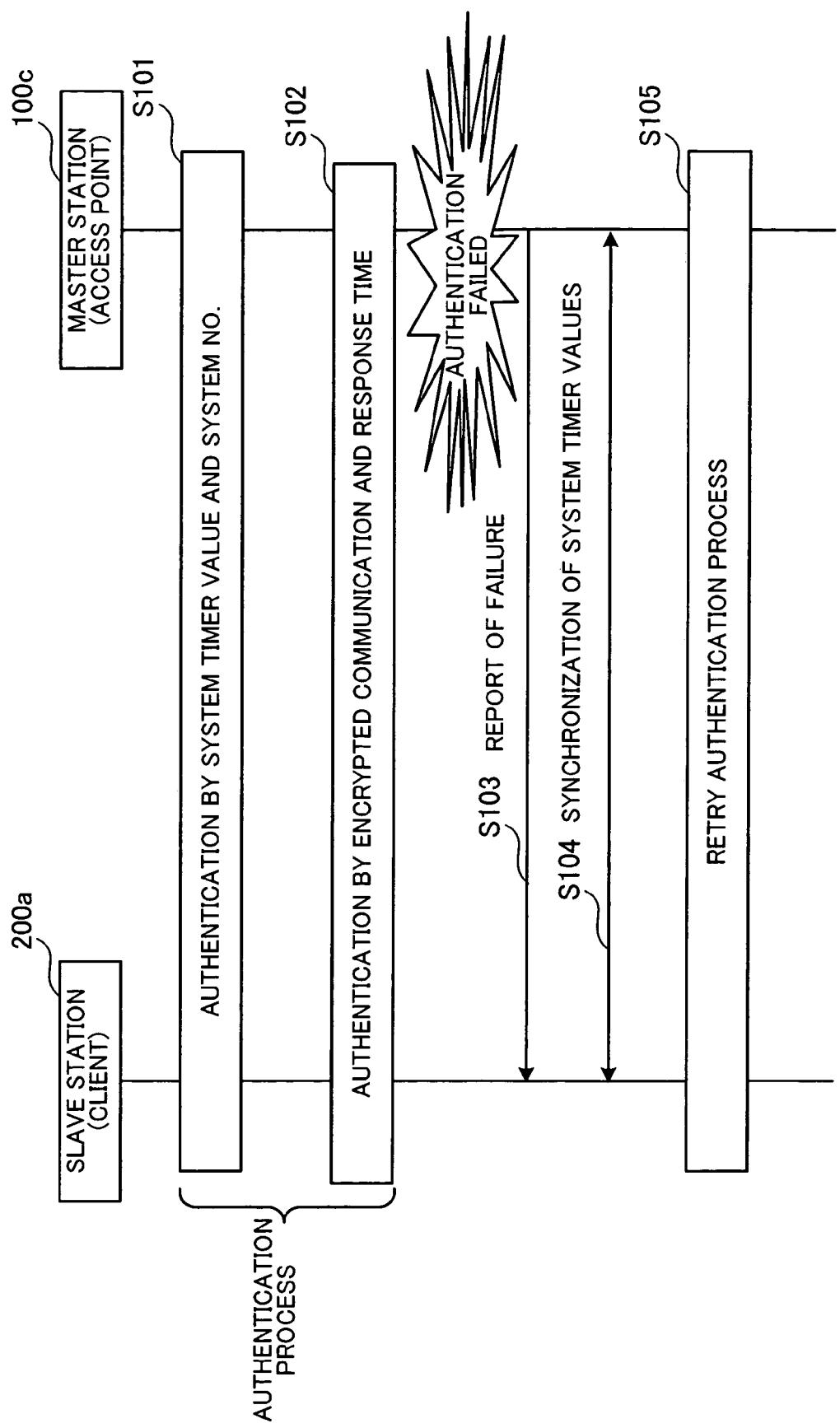
FIG. 20 is a sequence diagram illustrating a process according to the fourth embodiment.

FIG. 20 is a sequence diagram illustrating the process according to the fourth embodiment. In the following, the process shown in FIG. 20 will be explained in order of step number.

STEP S101: The authentication by means of the system timer value and the system number is performed between the access point 100c and the client 200a.

STEP S102: The authentication by means of encrypted data communication and response time is performed between the access point 100c and the client 200a.

STEP S103: If either of the authentications fails (authentication failed), a response indicative of the failure is sent from the access point 100c to the client 200a.

STEP S104: In response to a request from the time synchronizer 281 of the client 200a, the system timer values are synchronized by means of the time synchronizer 281 and the timer authenticator 130b of the access point 100c. Specifically, the system timer value held by the access point 100*c* is sent to the client 200*a* and is set in the system timer 240 by the time synchronizer 281.

STEP S105: The retry processor 282 retries the authentication request.

Thus, even if the authentication sequence fails due to poor communication quality (poor radio wave propagation state of the wireless LAN), communication can be established by retrying the authentication sequence.

Fifth Embodiment

A fifth embodiment will be now described. In the fifth embodiment, the authentication process is performed at irregular intervals, thereby making it difficult for an outsider to analyze the authentication-related data.

Figure 21:
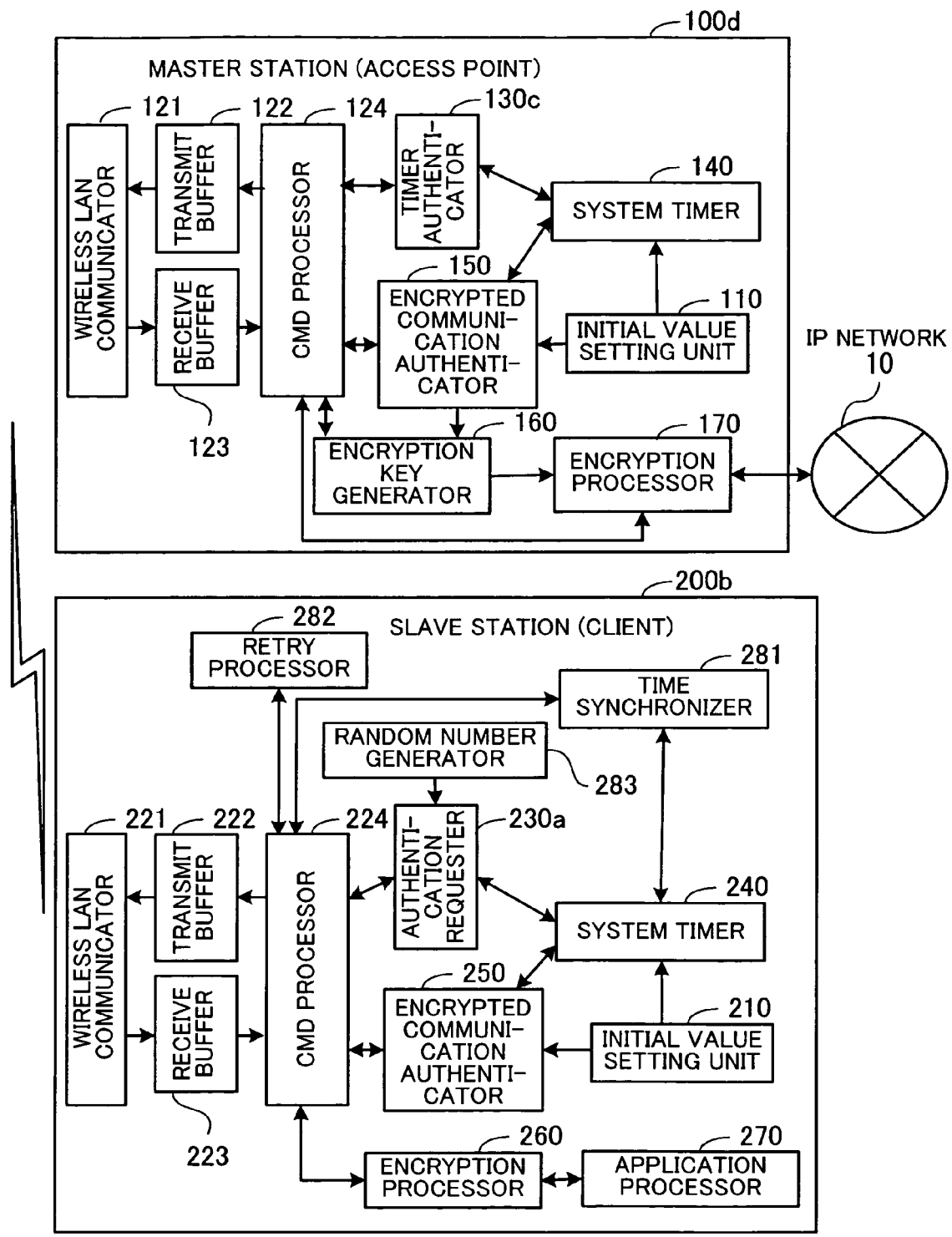
FIG. 21 is a block diagram illustrating the functions of an access point and a client according to a fifth embodiment.

FIG. 21 is a block diagram illustrating functions of the access point and the client according to the fifth embodiment. The fifth embodiment is almost identical in configuration with the fourth embodiment. In the figure, therefore, identical reference numerals are used to denote elements identical with those of the fourth embodiment shown in FIG. 19, and description of such elements is omitted.

In the fifth embodiment, the access point 100*d* and the client 200*b* are configured differently from those of the fourth embodiment. Specifically, the timer authenticator 130*c* of the access point 100*d* issues a request for the authentication request command to the already authenticated client 200*b* at predetermined intervals of time. The authentication request command request is a request whereby the client 200*b* is notified that the authentication process should be again performed. The timer authenticator 130*c* has a monitoring timer therein for measuring the time elapsed from the issue of the authentication request command request. If an authentication request command is received from the client 200*b* after the value of the monitoring timer exceeds a predetermined time (e.g., 300 seconds), the timer authenticator 130*c* causes a time-out event to occur, thereby making the authentication process fail.

Also, the client 200*b* is additionally provided with a random number generator 283. In response to a request from the authentication requester 230*a*, the random number generator 283 generates a random number (two-digit number in hexadecimal) which determines the interval between authentication processes. The random number is set so as not to be greater than a maximum time interval between authentication processes. The generated random number is passed on to the authentication requester 230*a*.

The authentication requester 230*a* has the processing function described below, in addition to the function of the authentication requester 230 of the fourth embodiment. On receiving the authentication request command request from the access point 100*d*, the authentication requester 230*a* requests the random number generator 283 to generate a random number. When the generated random number is received from the random number generator 283, the authentication requester 230*a* waits for a time corresponding to the random number (waits for the number of seconds corresponding to the value of the random number) and then transmits an authentication request command to the access point 100*d*.

Thus, in the fifth embodiment, the authentication process, which is triggered by the authentication request command from the slave station (client 200*b*), is not repeated at fixed intervals of time, and in response to the authentication request command request from the master station (access point), a two-digit random number is generated at the slave station (client). After a lapse of the time (number of seconds) corresponding to the value of the random number, the client 200*b* transmits an authentication request command to the master station (access point). At the master station (access point 100*d*), the monitoring timer is started when the authentication request command request is transmitted to the slave station (client 200*b*). The time-out of the monitoring timer is set to a value (e.g., "300") greater than the maximum value ("FF"="255") of the two-digit random number, and if the authentication request command from the slave station (client) fails to reach before the monitoring timer expires (within 300 seconds), the wireless LAN link is disconnected.

Figure 22:
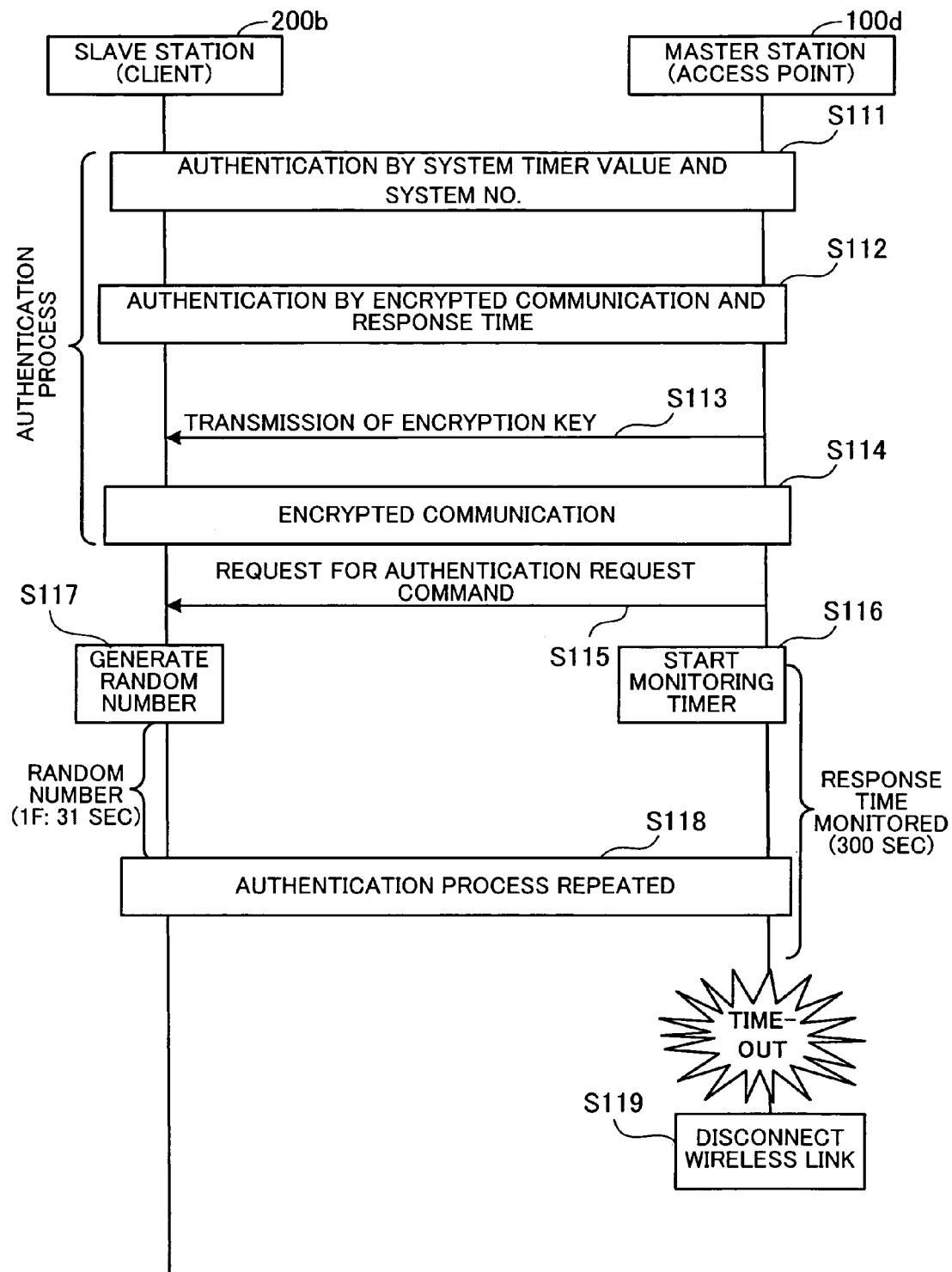
FIG. 22 is a sequence diagram illustrating a process according to the fifth embodiment.

FIG. 22 is a sequence diagram illustrating the process according to the fifth embodiment. In the following, the process shown in FIG. 22 will be explained in order of step number.

STEP S111: The authentication by means of the system timer value and the system number is performed between the access point 100*d* and the client 200*b*.

STEP S112: The authentication by means of encrypted communication and response time is performed between the access point 100*d* and the client 200*b*.

STEP S113: An encryption key is transmitted from the access point 100*d* to the client 200*b*.

STEP S114: Encrypted data is communicated between the access point 100*d* and the client 200*b*.

STEP S115: After a lapse of a predetermined time from the successful authentication, an authentication request command request is transmitted from the access point 100*d* to the client 200*b*.

STEP S116: At the access point 100*d*, the timer authenticator 130*c* starts the monitoring timer therein to initiate time measurement.

STEP S117: At the client 200*b*, the random number generator 283 generates a random number and transfers same to the authentication requester 230*a*.

STEP S118: After a lapse of the time corresponding to the random number, the authentication requester 230*a* issues an authentication request command, whereupon an authentication process identical with that of Steps S111 to S114 is performed.

STEP S119: If no authentication request command reaches the access point 100*d* by the time the value of the monitoring timer reaches the predetermined value (e.g., 300 seconds), the timer authenticator 130*c* causes time-out to occur. In this case, the timer authenticator 130*c* judges that the authentication failed, and disconnects the wireless LAN link to the client 200*b*.

If the authentication process is repeated at fixed intervals of time, a wireless LAN intruder may easily capture and analyze the wireless LAN data communicated between the master station (access point) and the slave station (client). When the worst comes to the worst, the time at which the encryption key is transmitted is discovered by the intruder, which results in the leakage of the encryption key. According to the fifth embodiment, the authentication process is repeated at irregular intervals, and this makes it difficult for an intruder to analyze the communicated data, thereby further enhancing security.

Figure 23:
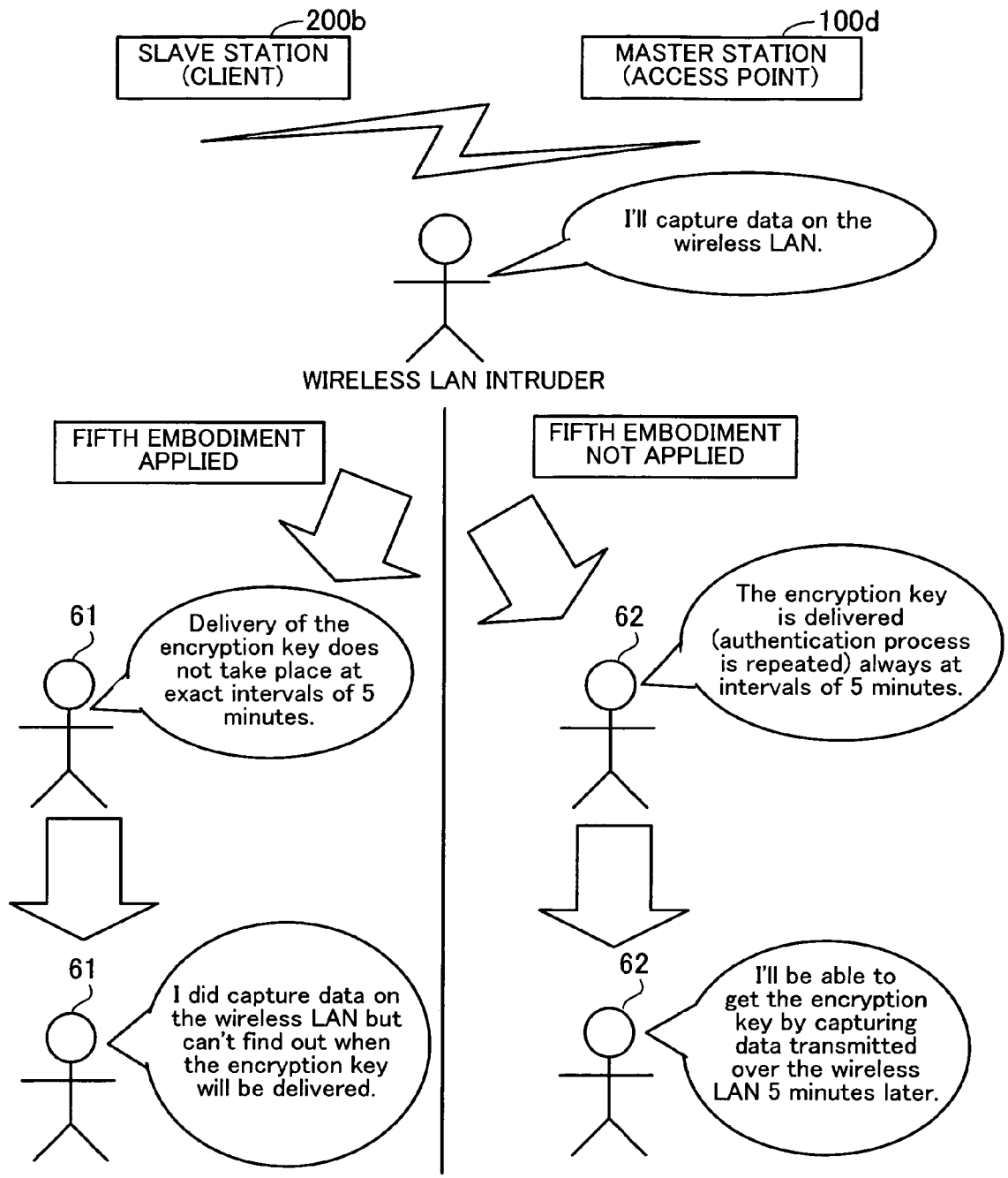
FIG. 23 is a conceptual diagram illustrating the difference in easiness of intrusion into a wireless LAN depending on whether the fifth embodiment is applied or not.

FIG. 23 is a conceptual diagram illustrating the difference in easiness of intrusion into a wireless LAN depending on whether the fifth embodiment is applied or not. In the illustrated example, it is assumed that an outsider tries to intrude into the wireless LAN via which the access point 100*d* and the client 200*b* are connected. In the first stage of the intrusion into the wireless LAN, the outsider acquires (captures) data (in particular, encryption key) relating to the authentication procedure carried out via the wireless LAN, and analyzes the captured data.

In FIG. 23, the lower left part shows the case where the function of the fifth embodiment is used, and the lower right part shows the case where the fifth embodiment is not applied.

Where the fifth embodiment is not applied, the outsider 62 can infer that the encryption key is delivered at intervals of five minutes, on discovering that the authentication process is performed at intervals of five minutes. Thus, the outsider captures data communicated over the wireless LAN after a lapse of five minutes from the establishment of authentication, whereby he/she can acquire the data containing the encryption key. By analyzing the data, the outsider can acquire the encryption key.

On the other hand, where the fifth embodiment is applied, the delivery timing of the encryption key is determined by the time corresponding to a generated random number and thus is irregular. Accordingly, the outsider 61 is unable to find out when the encryption key will be delivered. For example, even in the case where the authentication process is repeated at intervals of five minutes, delivery of the encryption key does not take place at exact intervals of five minutes. As a result, even if the outsider 61 captures data communicated over the wireless LAN, he/she is unable to find out when the encryption key will be delivered, making it extremely difficult for the outsider to detect the encryption key from among the communicated data.

Thus, by repeating the authentication process at irregular intervals, it is possible to enhance the tolerance to illegal act such as intrusion into the wireless LAN.

Sixth Embodiment

A sixth embodiment will be now described. In the sixth embodiment, a limit is set to the number of slave stations connectable to the access point.

Figure 24:
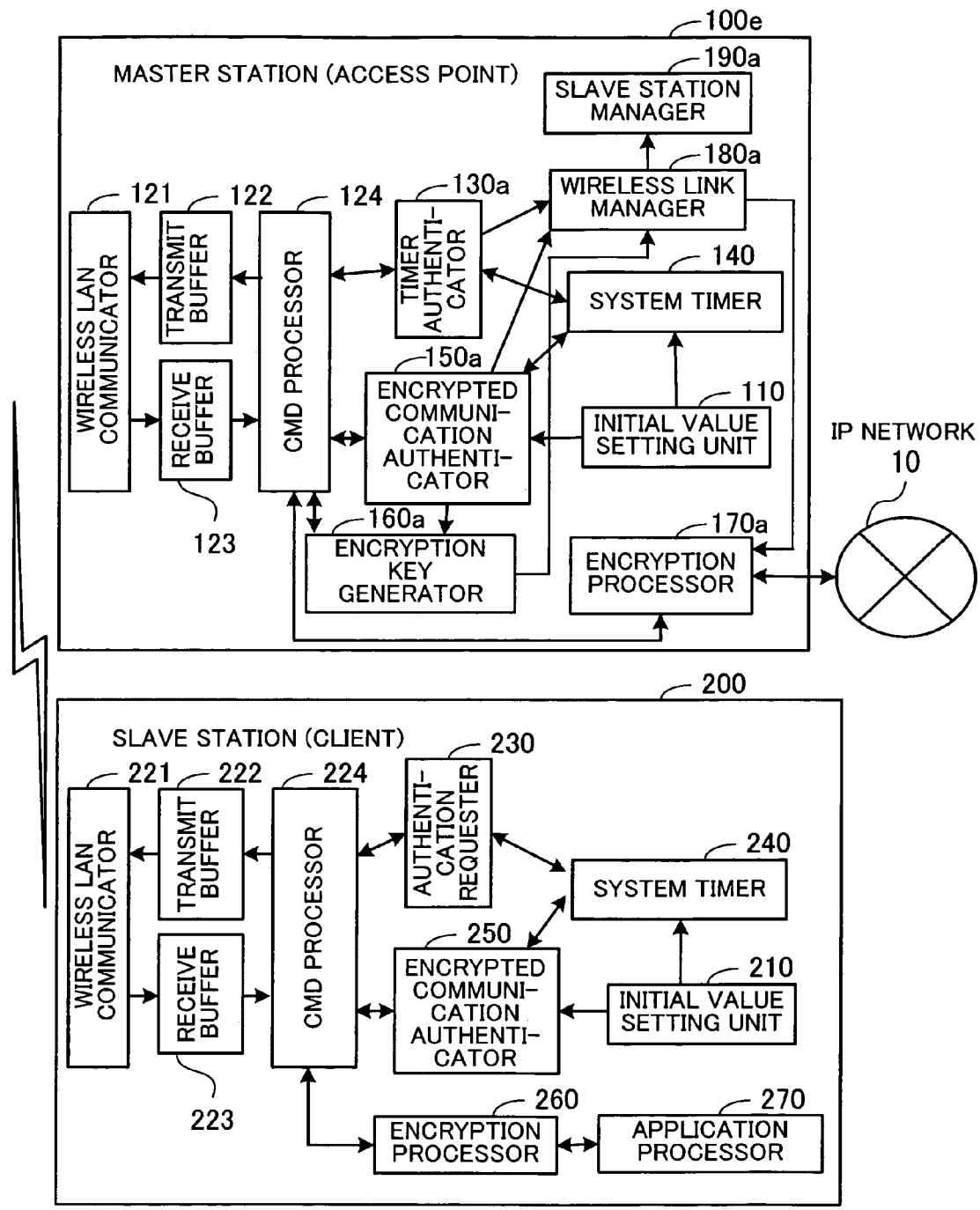
FIG. 24 is a block diagram illustrating the functions of an access point and a client according to a sixth embodiment.

FIG. 24 is a block diagram illustrating functions of the access point and the client according to the sixth embodiment. The sixth embodiment is almost identical in configuration with the third embodiment. In the figure, therefore, identical reference numerals are used to denote elements identical with those of the third embodiment shown in FIG. 15, and description of such elements is omitted.

The sixth embodiment differs from the third embodiment in the function of the slave station manager 190a of the access point 100e. Specifically, the slave station manager 190a manages the number of connected slave stations. The slave station manager 190a has a maximum connectable number defined therein and, if an authentication request command is received from a client in excess of the maximum connectable number, causes the authentication responsive to the received authentication request command to fail.

More specifically, at the access point 100e, the authentication process is triggered by an authentication request command from the slave station (client 200). The slave station manager 190a registers the slave station (client 200) of which the connection (authentication process) is completed, in a slave station management table with a quantitative limit held by the master station (access point 100e). If the number of registered slave stations (clients) reaches a predetermined number (e.g., "5"), the slave station manager 190a does not respond to an additional authentication request command from a slave station (client) which is newly attempting connection, and disconnects the wireless LAN link to the client.

Figure 25:
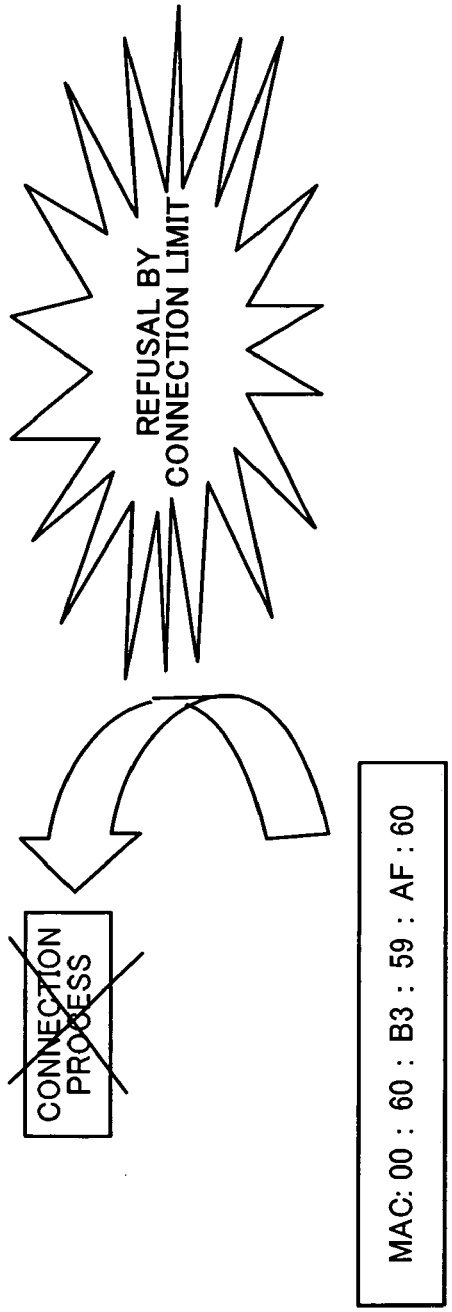
FIG. 25 shows an exemplary data structure of a slave station management table with a quantitative limit.

FIG. 25 shows an exemplary data structure of the slave station management table with a quantitative limit. This slave station management table 191a has columns labeled "MAC ADDRESS," "AUTHENTICATION STATUS," "AUTHENTICATION COUNT," and "ENCRYPTION KEY." The items of information in each row are associated with one another and constitute one record.

In the column "MAC ADDRESS" is set the MAC address of the client which has established a wireless LAN link. In the column "AUTHENTICATION STATUS" is set the authentication status of the client which has established a wireless LAN link, and in the column "AUTHENTICATION COUNT" is set the number of times the client which has established a wireless LAN link was successively authenticated while the link is established. In the column "ENCRYPTION KEY" is set the encryption key generated for the client which has established a wireless LAN link.

In the example shown in FIG. 25, the number of connectable clients is "5," and five clients have already established wireless LAN connection. While in this state, if another client with the MAC address "00:60:B3:59:AF:60" attempts connection (e.g., issues an authentication request command) and if the connection is permitted, then the connection limit is exceeded. Accordingly, the slave station manager 190a refuses the connection. As a result, the connection process (including the authentication process) is not performed and the wireless LAN link to that client is disconnected.

Thus, by setting a limit to the number of slave stations to be connected, it is possible to reduce the processing load on the master station (access point) attributable to congestion of data related with the connection process.

Seventh Embodiment

A seventh embodiment will be now described. The seventh embodiment is applied to the case where there is no master station-slave station relationship and can provide secure wireless LAN communication between devices both equally functioning as a client. In the seventh embodiment, each client is provided with the function necessary to act as a master station, whereby a secure wireless LAN environment is configured.

Figure 26:
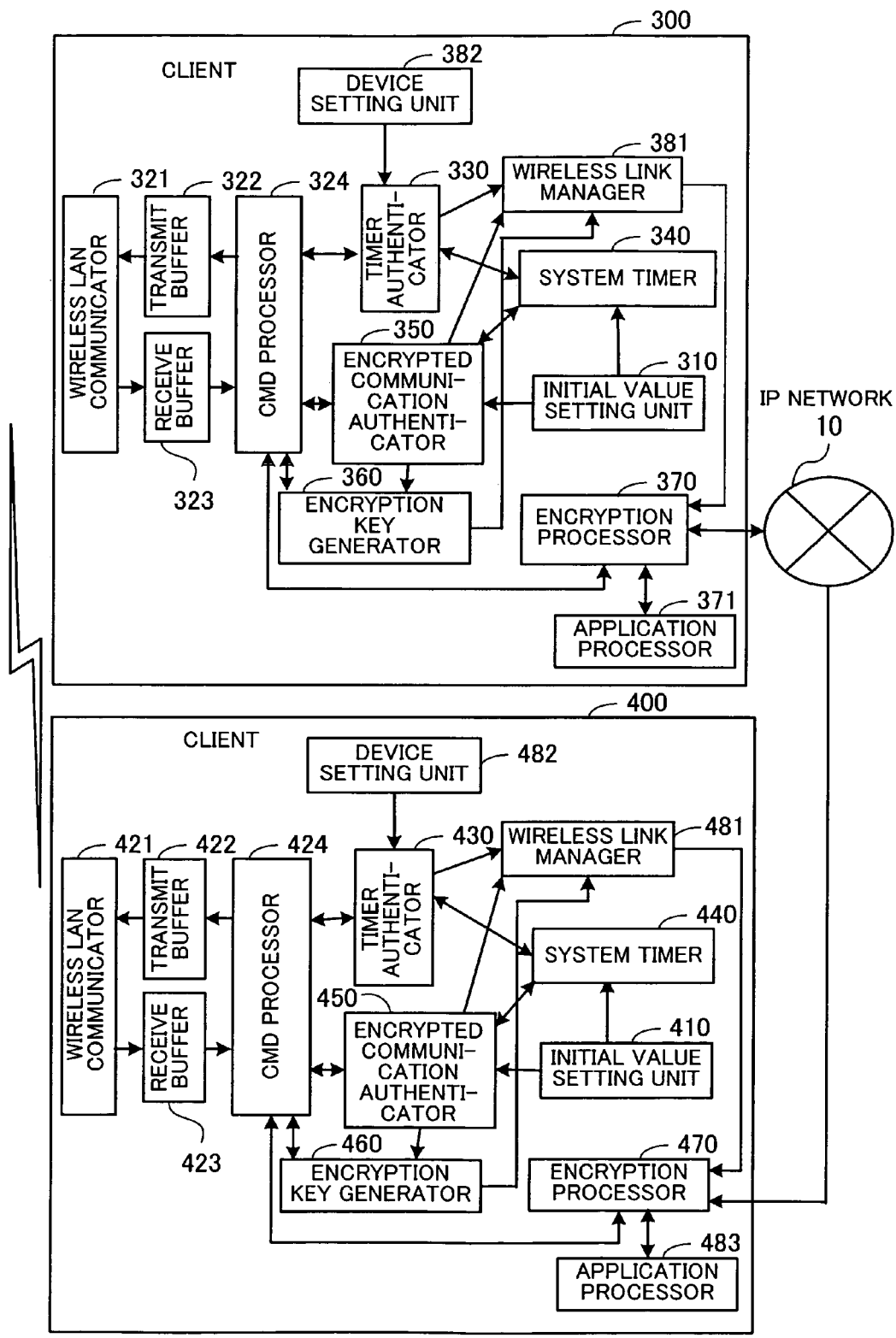
FIG. 26 is a block diagram illustrating the function of a client according to a seventh embodiment.

FIG. 26 is a block diagram illustrating the function of the client according to the seventh embodiment. As shown in FIG. 26, the clients 300 and 400 are connected via a wireless LAN.

The client 300 includes an initial value setting unit 310, a wireless LAN communicator 321, a transmit buffer 322, a receive buffer 323, a command (CMD) processor 324, a timer authenticator 330, a system timer 340, an encrypted communication authenticator 350, an encryption key generator 360, an encryption processor 370, an application processor 371, a wireless link manager 381, and a device setting unit 382.

The initial value setting unit 310, the wireless LAN communicator 321, the transmit buffer 322, the receive buffer 323, the command (CMD) processor 324, the system timer 340 and the application processor 371 have functions identical with those of the corresponding elements in the client 200 of the second embodiment shown in FIG. 12. The timer authenticator 330 has the function of the timer authenticator 130a in the access point 110a of the second embodiment shown in FIG. 12, as well as the function of the authentication requester 230 in the client 200. The encrypted communication authenticator 350 has the function of the encrypted communication authenticator 150a in the access point 100a of the second embodiment shown in FIG. 12, as well as the function of the encrypted communication authenticator 250 in the client 200. The encryption key generator 360 and the wireless link manager 381 have functions identical with those of the corresponding elements in the access point 100a of the second embodiment shown in FIG. 12. The encryption processor 370 has the function of the encryption processor 170a in the access point 100a of the second embodiment shown in FIG. 12, as well as the function of the encryption processor 260 in the client 200.

The device setting unit 382 switches the function of the device so that the device may act as either a master station or a slave station. The timer authenticator 330, the encrypted communication authenticator 350 and the encryption processor 370 operate in an operation mode (slave station or master station) specified by the device setting unit 382.

The client 400 includes an initial value setting unit 410, a wireless LAN communicator 421, a transmit buffer 422, a receive buffer 423, a command (CMD) processor 424, a timer authenticator 430, a system timer 440, an encrypted communication authenticator 450, an encryption key generator 460, an encryption processor 470, an application processor 483, a wireless link manager 481, and a device setting unit 482.

In cases where a slave station (client)-slave station (client) connection is established in such a wireless LAN system without using a master station (access point), a network intruder may intrude into the wireless section, giving rise to an authentication problem. Namely, where no master station (no access point) is provided, the authentication scheme for the master station (access point)-slave station (client) connection cannot be used.

According to the seventh embodiment, the slave station (client) is provided with the encryption key generator 360 and the wireless link manager 381, which are the functional elements originally provided in a master station (access point), and holds the set values necessary for the master station/slave station authentication process. The operation mode of the slave station is switched by the device setting unit 382. Thus, by switching the device settings in accordance with the wireless LAN system, it is possible to implement the authentication scheme in any wireless LAN system.

Where wireless LAN communication is performed between the two clients 300 and 400, it is necessary that the operation modes (master station mode or slave station mode) be decided by the respective device setting units 382 and 482 in accordance with a certain rule. The operation mode decision rule may be set, for example, such that a client which transmits an authentication request command earlier acts as a slave station.

Figure 27:
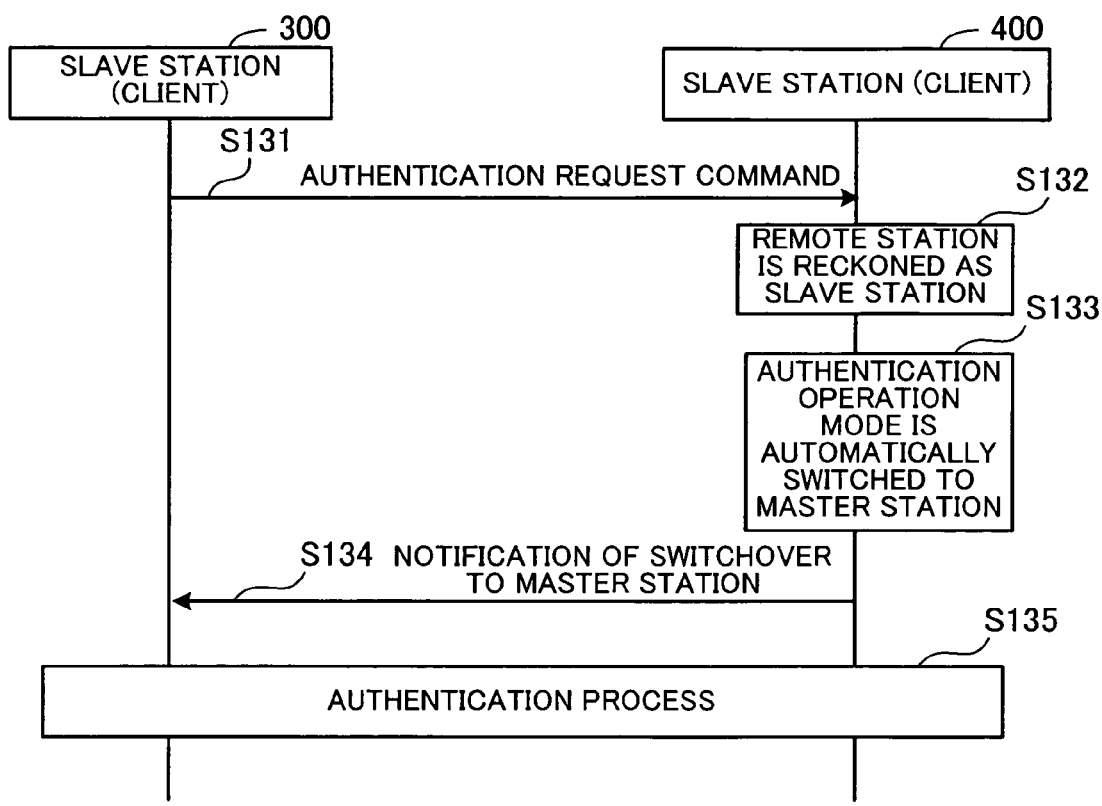
FIG. 27 is a sequence diagram illustrating a first example of operation mode decision method.

FIG. 27 is a sequence diagram illustrating a first example of the operation mode decision method. In the following, the process shown in FIG. 27 will be explained in order of step number. In the illustrated example, it is assumed that the initial authentication operation mode is the slave station mode.

STEP S131: An authentication request command is sent from the client 300 to the client 400.

STEP S132: On receiving the authentication request command, the device setting unit 482 of the client 400 judges that the remote station is to act as a slave station.

STEP S133: The device setting unit 482 automatically switches the authentication operation mode to the master station mode.

STEP S134: The device setting unit 482 notifies the client 300 that the authentication operation mode thereof has been switched to the master station mode.

STEP S135: The authentication process is performed between the client 300 as the slave station and the client 400 as the master station.

In this manner, where a slave station (client)-slave station (client) connection is to be established, the slave station (client) which has received an authentication request command recognizes that the remote station is to act as a slave station (client), and then automatically switches the authentication operation mode thereof to the master station mode (access point mode). Thus, the authentication operation mode is automatically switched at the time of authentication, and therefore, when the devices of the wireless LAN system are set up, it is unnecessary to pay attention to the authentication operation mode (master station/slave station mode).

Eighth Embodiment

An eighth embodiment will be now described. In the eighth embodiment, the authentication operation mode is decided through the comparison of each other's unique words (unique numerical values). The eighth embodiment is identical in system configuration with the seventh embodiment shown in FIG. 26; therefore, the process according to the eighth embodiment will be explained below with reference also to FIG. 26.

Figure 28:
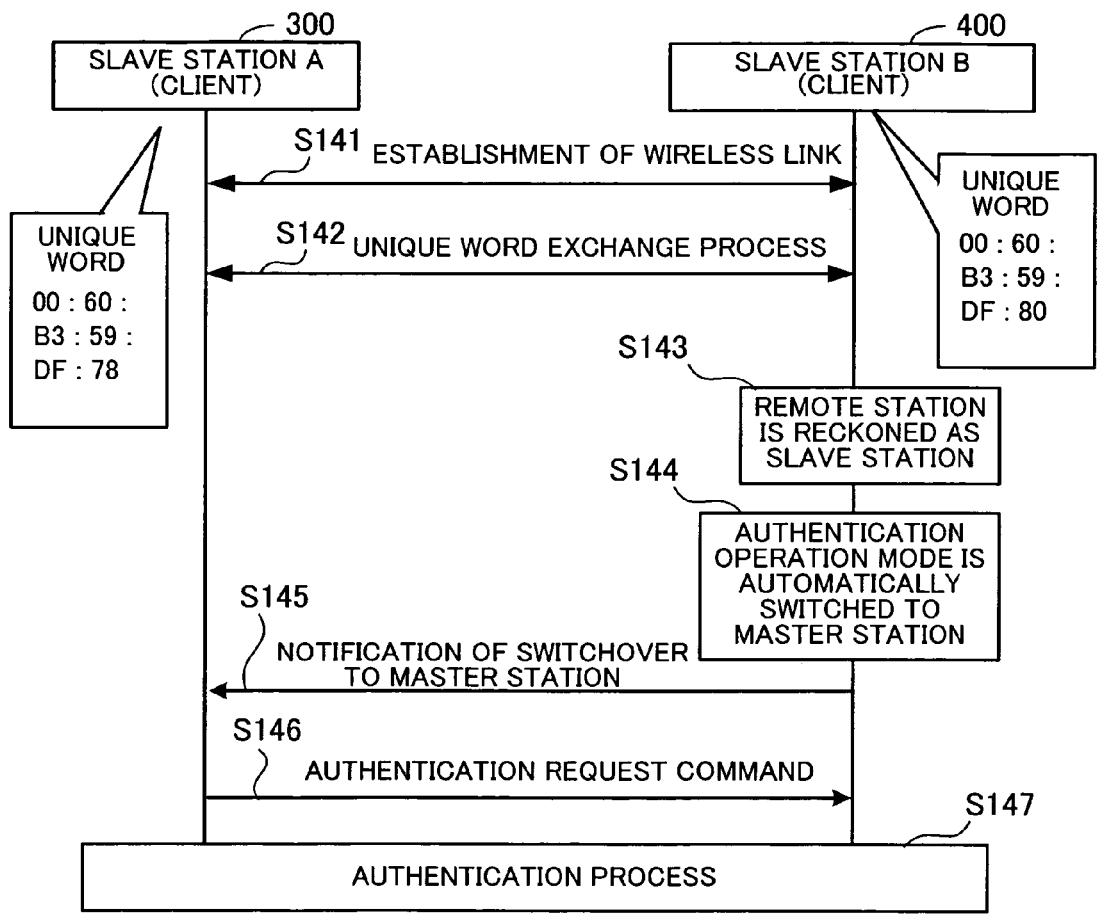
FIG. 28 is a sequence diagram illustrating a second example of operation mode decision method.

FIG. 28 is a sequence diagram illustrating a second example of the operation mode decision method. In the following, the process shown in FIG. 28 will be explained in order of step number. In the illustrated example, it is assumed that the initial authentication operation mode is the slave station mode.

STEP S141: A wireless link is established between the clients 300 and 400.

STEP S142: The device setting units 382 and 482 of the clients 300 and 400 exchange each other's unique words. As the unique word, the MAC address may be used, for example. In the example shown in FIG. 28, a unique word "00:60:B3:59:DF:78" is generated by the device setting unit 382 of the client 300, and a unique word "00:60:B3:59:DF:80" is generated by the device setting unit 482 of the client 400.

STEP S143: The device setting units 382 and 482 of the clients 300 and 400 individually compare each other's unique words and judge that the client which has generated a unique word with a greater value is to act as a master station. In the example of FIG. 28, the device setting unit 482 judges that the remote station is to act as a slave station and the client 400 as a master station.

STEP S144: The device setting unit 482 automatically sets the authentication operation mode thereof to the master station mode.

STEP S145: The device setting unit 482 notifies the client 300 that the authentication operation mode thereof has been switched to the master station mode.

STEP S146: The authentication process is performed between the client 300 as the slave station and the client 400 as the master station.

Thus, the device setting unit 382 has the function whereby, after the establishment of a wireless LAN link, the unique words are exchanged prior to execution of the authentication process. In the unique word exchange process, the unique words (e.g., MAC addresses) set for the respective slave stations (clients) are exchanged and the values of the unique words are compared with each other. The client which has been assigned a unique word with a greater value automatically switches the authentication operation mode thereof to the master station mode (access point mode).

By performing the unique word exchange process prior to the authentication process, it is possible to automatically switch the authentication operation mode, and therefore, when the devices of the wireless LAN system are set up, it is unnecessary to pay attention to the authentication operation mode (master station/slave station mode). Moreover, where the MAC addresses are used as the unique words, the master station-slave station relationship between every two devices is fixed, thus preventing the relationships of the devices within the system from becoming unnecessarily complicated.

Ninth Embodiment

A ninth embodiment will be now described. In the ninth embodiment, the encryption scheme used in the encryption processor is changed in accordance with the system timer value. The ninth embodiment is identical in system configuration with the first embodiment shown in FIG. 7; therefore, the process according to the ninth embodiment will be explained below with reference also to FIG. 7.

In the process of master station (access point 100)-slave station (client 200) authentication, first, the authentication by means of the system timer value and the system number is performed by the timer authenticator 130, and if this authentication succeeds, the encrypted communication authenticator 150 performs the authentication by means of encrypted communication. In the following, information including the system timer value and the system number is referred to as system timer authentication information. At this time, the encrypted communication authenticator 150 determines the encryption scheme to be used, in accordance with the system timer authentication information. Then, using the determined encryption scheme, the encrypted communication authenticator 150 encrypts the generated random number. In this case, as the encryption key, the encryption key set by the initial value setting unit 110 is used.

The correlation between the system timer authentication information and the encryption scheme is managed, for example, by an encryption scheme management table.

FIG. 29 shows an exemplary data structure of the encryption scheme management table. The encryption scheme management table 151 shows the correlation between the system timer authentication information and the corresponding encryption scheme and is stored in the encrypted communication authenticator 150. Also, an encryption scheme management table identical in content with the table 151 is stored in the encrypted communication authenticator 250 of the client 200.

The encryption scheme management table 151 has columns labeled "SYSTEM TIMER AUTHENTICATION INFORMATION" and "ENCRYPTION SCHEME" in association with range identifiers. The items of information in each row are associated with each other.

In the column "SYSTEM TIMER AUTHENTICATION INFORMATION" is set the range of values of the system timer authentication information. The data structure of the system timer authentication information is shown in FIG. 8.

In the column "ENCRYPTION SCHEME" is set the encryption scheme corresponding to the system timer authentication information.

If the system timer value is "A32ED971" (hexadecimal) and the system number is "1A" (hexadecimal), for example, the system timer authentication information is "A32ED971FFFFFF1A" (hexadecimal). In this case, "SCHEME D" in the encryption scheme management table 151 shown in FIG. 29 is determined as the encryption scheme.

The encryption scheme management tables held by the access point 100 and the client 200 are identical in content, and accordingly, an identical encryption scheme is employed insofar as the system timer authentication information is the same.

Figure 30:
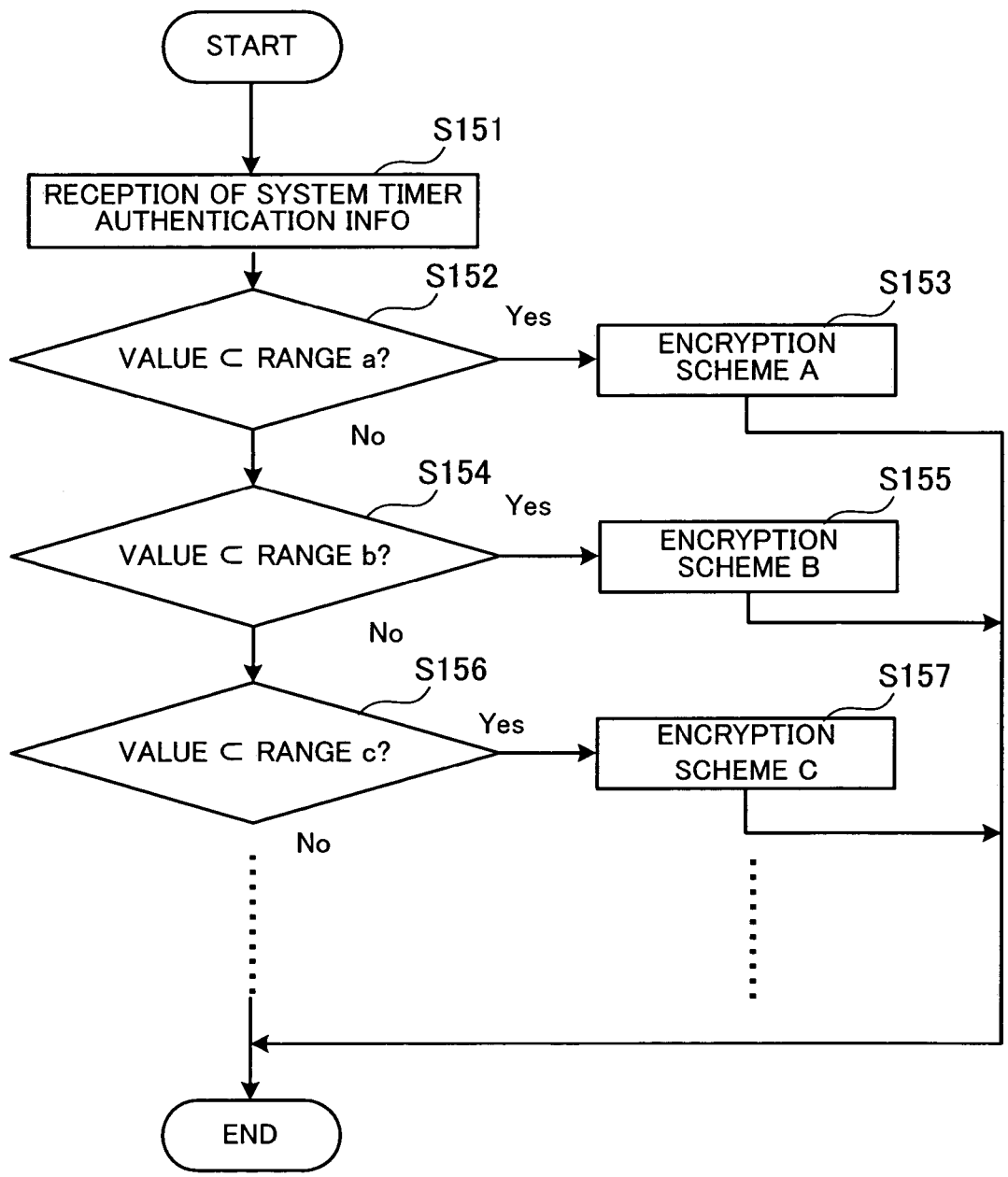
FIG. 30 is a flowchart illustrating an encryption scheme decision process.
Figure 31:
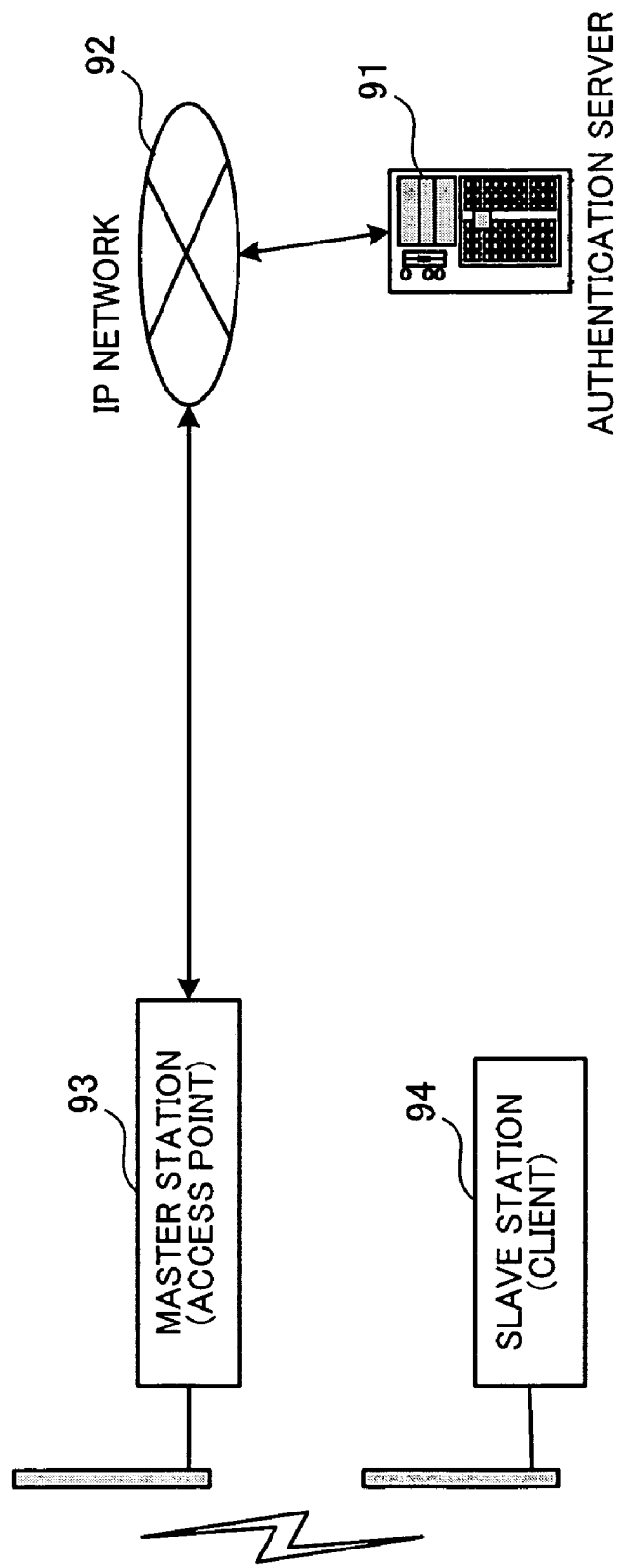
FIG. 31 shows an exemplary configuration of a conventional wireless LAN system.
Figure 32:
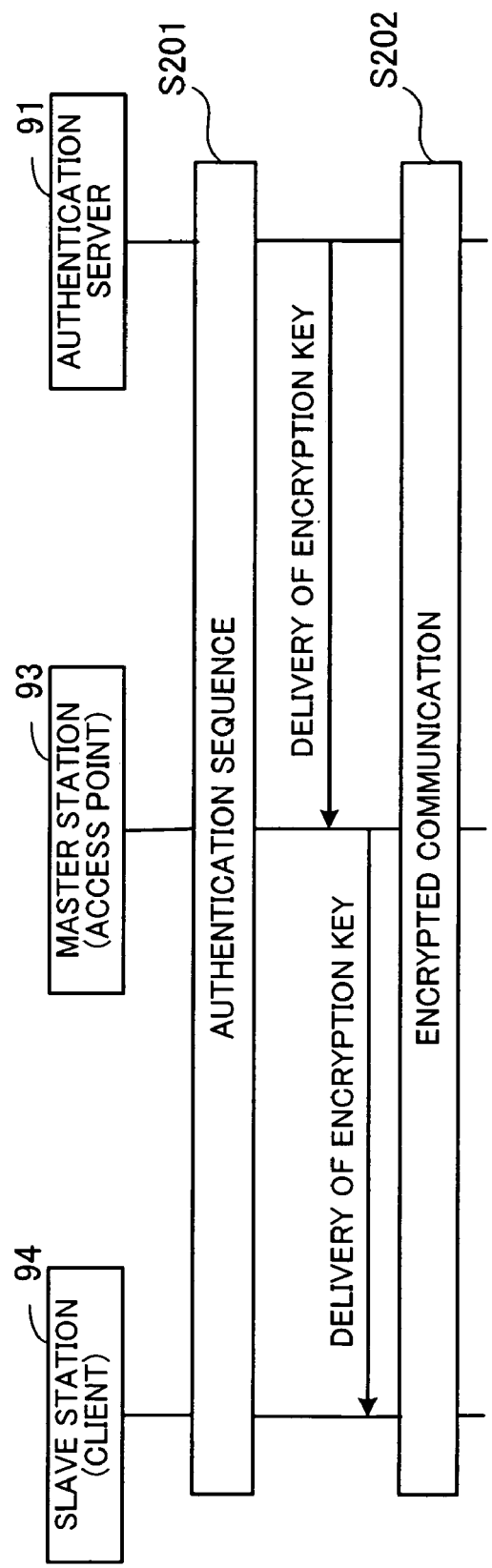
FIG. 32 illustrates an authentication sequence of the conventional wireless LAN system.

FIG. 30 is a flowchart illustrating the encryption scheme decision process. In the following, the process shown in FIG. 30 will be explained in order of step number.

STEP S151: The encrypted communication authenticator 150 receives system timer authentication information.

STEP S152: The encrypted communication authenticator 150 determines whether or not the value of the system timer authentication information falls within the range corresponding to the range identifier "a." If the value falls within that range, the process proceeds to Step S153; if not, the process proceeds to Step S154.

STEP S153: The encrypted communication authenticator 150 encrypts the generated random number by using the encryption scheme A and transmits the encrypted data to the client 200. Then, the encrypted communication authenticator 150 suspends the process and waits for a response from the client 200.

STEP S154: The encrypted communication authenticator 150 determines whether or not the value of the system timer authentication information falls within the range corresponding to the range identifier "b." If the value falls within that range, the process proceeds to Step S155; if not, the process proceeds to Step S156.

STEP S155: The encrypted communication authenticator 150 encrypts the generated random number by using the encryption scheme B and transmits the encrypted data to the client 200. Then, the encrypted communication authenticator 150 suspends the process and waits for a response from the client 200.

STEP S156: The encrypted communication authenticator 150 determines whether or not the value of the system timer authentication information falls within the range corresponding to the range identifier "c." If the value falls within that range, the process proceeds to Step S157; if not, the process proceeds to the subsequent step to determine whether or not the value falls within another range.

STEP S157: The encrypted communication authenticator 150 encrypts the generated random number by using the encryption scheme C and transmits the encrypted data to the client 200. Then, the encrypted communication authenticator 150 suspends the process and waits for a response from the client 200.

The process described above is performed by the encrypted communication authenticator 150 of the access point 100. The encrypted communication authenticator 250 of the client 200 also determines the encryption scheme following the same procedure. In the encrypted communication authenticator 250, however, after the encryption scheme is determined, the data received from the access point 100 is decrypted by using a decryption scheme corresponding to the determined encryption scheme.

When transmitting the system timer authentication information and the device identification information thereafter to the access point 100, the encrypted communication authenticator 250 of the client 200 encrypts the information by using an encryption scheme corresponding to the system timer authentication information. The encrypted data is transferred as a response to the access point 100.

On receiving the response from the client 200, the access point 100 determines the encryption scheme in accordance with the system timer authentication information and decrypts the received data by using a decryption scheme corresponding to the determined encryption scheme.

In this manner, a plurality of ranges are set for the system timer authentication information, and the encryption scheme to be used is defined with respect to each range. The encryption scheme is determined in accordance with the system timer authentication information which has been authenticated by the timer authentication. Accordingly, even if a network intruder tries to analyze the authentication procedure and the encryption scheme by capturing data transmitted over the wireless LAN, he/she finds it difficult to identify the encryption and decryption schemes since the encryption scheme is changed for every authentication process. Namely, by changing the encryption scheme each time the authentication process is performed, it is possible to further enhance security and prevent network intruders' attacks.

In the aforementioned example, the system timers of the access point and the client are each adapted to hold an eight-digit number in hexadecimal. Alternatively, a 10-digit number may be held by each system timer and the timer authenticator may be adapted to make a comparison of the high order eight digits only. In this case, a difference in the low order two digits is regarded as an allowable error. The system timer value in the system timer is incremented by adding "1" at a time to the lowest order one digit of the 10-digit number with lapse of every second. This makes it unnecessary to have the system timer value of the access point exactly coincide with that of the client and also facilitates the synchronization process (process for coordinating the system timer initial values).

The aforementioned processing function of the access point or the client can be performed by a computer. In this case, a program (wireless communication authentication program or wireless communication program) is prepared in which is described the process for performing the function of the access point or the client. The program is executed by a computer, whereupon the aforementioned processing function is accomplished by the computer. The program describing the process may be recorded on computer-readable recording media. As such computer-readable recording media, magnetic recording devices, optical discs, magneto-optical recording media, semiconductor memories, etc. may be used. Magnetic recording devices include a hard disk drive (HDD), a flexible disk (FD), a magnetic tape, etc. Optical discs include a DVD (Digital Versatile Disc), a DVD-RAM (Random Access Memory), a CD-ROM (Compact Disc Read Only Memory), a CD-R (Recordable)/RW (ReWritable), etc. Magneto-optical recording media include an MO (Magneto-Optical disc) etc.

To market the program, portable recording media, such as DVDs and CD-ROMs, on which the program is recorded may be put on sale. Alternatively, the program may be stored in the storage device of a server computer and may be transferred from the server computer to other computers via a network.

A computer which is to execute the program stores in its storage device the program recorded on a portable recording medium or transferred from the server computer, for example. Then, the computer loads the program from its storage device and performs the process in accordance with the program. The computer may load the program directly from the portable recording medium to perform the process in accordance with the program. Also, as the program is transferred from the server computer, the computer may sequentially execute the process in accordance with the received program.

As described above, according to the present invention, the system timer values for which an optional value is set beforehand are individually incremented and are compared with each other for the purpose of authentication. Thus, only the wireless communication devices whose system timer values were set to an identical value in the past can be successfully authenticated by the wireless communication authentication device, whereby high-security wireless communication can be performed even via small-scale wireless networks.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium recording a wireless communication authentication program for authenticating a wireless communication device connected via a wireless network or being authenticated by the wireless communication device, the wireless communication authentication program, when executed by a processor, causing a computer to perform first processes comprising:

periodically incrementing a local system timer value thereof for which an optional numerical value is set beforehand; and exchanging unique numerical values with the wireless communication device and comparing magnitude relation between the unique numerical values, wherein:

if the magnitude relation between the unique numerical values fulfills a predetermined condition, the wireless communication authentication program further causes the computer to perform second processes comprising:

comparing, on reception of a first authentication request command including a remote system timer value from the wireless communication device, the received remote system timer value with the local system timer value assumed at the time of the reception;

determining whether the remote system timer value and the local system timer value coincide or not to judge whether to provisionally authenticate the wireless communication device which issued the first authentication request command;

generating a first random number if the provisional authentication by means of information included in the first authentication request command succeeds;

encrypting the first random number by using an encryption key which is set in common in devices permitted to participate in the wireless network;

transmitting the encrypted first random number to the wireless communication device;

decrypting, on reception of first response data from the wireless communication device, the first response data by using the encryption key;

comparing random number part data included in the decrypted first response data with the first random number; and determining whether the random number part data and the first random number coincide or not to judge whether to finally authenticate the wireless communication device determining whether the random number part data and the first random number coincide or not to judge whether to finally authenticate the wireless communication device, if a time elapsed from the transmission of the first encrypted random number to the reception of the first response data from the wireless communication device does not exceed a predetermined response requirement time; and if the magnitude relation between the unique numerical values does not fulfill the predetermined condition, the wireless communication authentication program further causes the computer to perform third processes comprising:

transmitting a second authentication request command including the local system timer value to the wireless communication device;

decrypting, on reception of an encrypted second random number from the wireless communication device, the encrypted second random number by using the encryption key;

encrypting second response data including the decrypted second random number by using the encryption key; and transmitting the encrypted second response data to the wireless communication device.

2. The computer-readable recording medium according to claim 1, wherein:

if the magnitude relation between the unique numerical values fulfills the predetermined condition, the wireless communication authentication program further causes the computer to perform encrypting the first random number by determining an encryption algorithm determined in accordance with the local system timer value and using the determined encryption algorithm; and if the magnitude relation between the unique numerical values does not fulfill the predetermined condition, the wireless communication authentication program further causes the computer to perform decrypting the second random number by determining an encryption algorithm in accordance with the local system timer value and using the determined encryption algorithm.

3. The computer-readable recording medium according to claim 1, wherein if the magnitude relation between the unique numerical values fulfills the predetermined condition, the wireless communication authentication program further causes the computer to perform judging that the authentication of the wireless communication device by means of the first response data has failed, if a time elapsed from the transmission of the encrypted first random number to the reception of the first response data from the wireless communication device exceeds a predetermined response requirement time.

4. The computer-readable recording medium according to claim 1, wherein:

if the magnitude relation between the unique numerical values fulfills the predetermined condition and the wireless communication device is successfully authenticated in a whole authentication process necessary for participation in the wireless network, the wireless communication authentication program further causes the computer to perform generating a first communication encryption key, transmitting the first communication encryption key to the wireless communication device, and communicating data encrypted by using the first communication encryption key, with the wireless communication device via the wireless network; and if the magnitude relation between the unique numerical values does not fulfill the predetermined condition and a whole authentication process necessary for participation in the wireless network succeeds in the wireless communication device, the wireless communication authentication program further causes the computer to perform receiving a second communication encryption key from the wireless communication device, and communicating data encrypted by using the second communication encryption key, with the wireless communication device via the wireless network.

5. The computer-readable recording medium according to claim 4, wherein:

if the magnitude relation between the unique numerical values fulfills the predetermined condition and the wireless communication device is successfully authenticated in the whole authentication process necessary for participation in the wireless network, the wireless communication authentication program further causes the computer to perform repeatedly performing the authentication process with respect to the wireless communication device at regular intervals, and generating the first communication encryption key with a different value each time the authentication process is performed; and if the magnitude relation between the unique numerical values does not fulfill the predetermined condition and the whole authentication process necessary for participation in the wireless network succeeds in the wireless communication device, the wireless communication authentication program further causes the computer to perform being subjected to the whole authentication process by the wireless communication device at regular intervals.

6. The computer-readable recording medium according to claim 1, wherein:

if the magnitude relation between the unique numerical values fulfills the predetermined condition and the provisional authentication by means of information included in the first authentication request command fails, the wireless communication authentication program further causes the computer to perform transmitting a response indicating a failure of authentication to the wireless communication device, and transmitting the local system timer value to the wireless communication device; and if the magnitude relation between the unique numerical values does not fulfill the predetermined condition and a response indicating a failure of a provisional authentication is received from the wireless communication device, the wireless communication authentication program further causes the computer to perform acquiring the remote system timer value set in the wireless communication device, synchronizing the local system timer value thereof with the acquired remote system timer value, and transmitting again the second authentication request command to the wireless communication device.

* * * * *

UNITED STATES PATENT AND TRADEMARK OFFICE
CERTIFICATE OF CORRECTION

PATENT NO.        : 7,672,457 B2                                      Page 1 of 1
APPLICATION NO.   : 11/236518
DATED             : March 2, 2010
INVENTOR(S)       : Yuji Nagano et al.

It is certified that error appears in the above-identified patent and that said Letters Patent is hereby corrected as shown below:

Column 32, Lines 54-57, after "communication device" delete "determining whether the random number part data and the first random number coincide or not to judge whether to finally authenticate the wireless communication device" (second occurrence).

Signed and Sealed this

Eighteenth Day of May, 2010

David J. Kappos
*Director of the United States Patent and Trademark Office*